(12) United States Patent
Choi et al.

(10) Patent No.: US 11,880,507 B1
(45) Date of Patent: Jan. 23, 2024

(54) AUTOMATED MUSICAL-SCORE-REFERENCED EVALUATION OF HAPTIC-BASED RHYTHMIC PERFORMANCE

(71) Applicant: Music App Inc., Houston, TX (US)

(72) Inventors: Sunny Sungeun Choi, Auburn, AL (US); Meghan Michele Kane, New York, NY (US); Frits van Laarhoven, Valkenswaard (NL)

(73) Assignee: Music App Inc., Houston, TX (US)

( * ) Notice: Subject to any disclaimer, the term of this patent is extended or adjusted under 35 U.S.C. 154(b) by 0 days.

(21) Appl. No.: 17/955,949

(22) Filed: Sep. 29, 2022

(51) Int. Cl.
*G06F 3/00* (2006.01)
*G06F 3/01* (2006.01)
*G10H 1/00* (2006.01)

(52) U.S. Cl.
CPC .......... *G06F 3/016* (2013.01); *G10H 1/0008* (2013.01)

(58) Field of Classification Search
None
See application file for complete search history.

(56) References Cited

U.S. PATENT DOCUMENTS

| 2003/0100965 | A1 | 5/2003 | Sitrick et al. | |
|---|---|---|---|---|
| 2009/0231276 | A1* | 9/2009 | Ullrich | G06F 3/016 345/157 |
| 2014/0033899 | A1 | 2/2014 | Dripps et al. | |
| 2017/0220112 | A1* | 8/2017 | Nakamura | B06B 1/0611 |
| 2020/0074876 | A1 | 3/2020 | Jancsy | |
| 2020/0193264 | A1* | 6/2020 | Zavesky | G06N 20/00 |
| 2021/0157844 | A1* | 5/2021 | Andon | G06F 3/017 |
| 2022/0121286 | A1* | 4/2022 | Kim | G06F 3/016 |
| 2022/0172640 | A1* | 6/2022 | Aharonson | G10G 1/00 |
| 2022/0180766 | A1* | 6/2022 | Aharonson | G10H 1/0008 |

OTHER PUBLICATIONS

International Search Report and Written Opinion dated Mar. 30, 2023 in International Patent Application No. PCT/US2022/045213, 10 pages.
https://youtu.be/Cy2wWNSWwEk?si=OkpQggUo7flapNjm.
https://www.rhythmlab-app.com/.

* cited by examiner

*Primary Examiner* — Toan H Vu
(74) *Attorney, Agent, or Firm* — Kilpatrick Townsend & Stockton LLP

(57) ABSTRACT

Techniques are described for automated musical-score-referenced evaluation of haptic-based rhythmic performance. An audiovisual representation of real-time progress through a musical score is output to a user. The output corresponds to progress through a sequence of score-notated rhythm (SNR) events at a tempo. During the outputting, haptic performance (HP) events are received from a user via a haptic interface as the user's rhythmic performance of the SNR events at the tempo. Automated techniques evaluate the user's performance to determine a rhythmic compatibility between the received HP events and evaluation data for the SNR events. Visual feedback is provided to the user to graphically map the evaluated performance to the SNR events on the musical score.

20 Claims, 8 Drawing Sheets

AUTOMATED MUSICAL-SCORE-REFERENCED EVALUATION OF HAPTIC-BASED RHYTHMIC PERFORMANCE

FIELD

Embodiments relate generally to musical performance feedback applications; and, more particularly, to automated evaluation of rhythmic haptic performance events relative to notated musical score events.

BACKGROUND

The ability to sight read musical rhythms is a critical skill at all levels of musical education. Standard musical notation includes a large symbology for designating rhythmic features. For example, a typical musical score indicates musical events over linear time. The musical events can include at least notes (generally designations of filled musical space, such as by a pitch) and rests (generally designations of empty musical space, such as by silence). Each musical event can be notated on the musical score with different forms to indicate the duration of the musical event. For example, a particular note or rest can be designated as consuming the duration of a whole note, half note, quarter note, eighth note, dotted quarter note, double-dotted quarter note, triplet, etc. By mapping the notated duration to a particular tempo (which may also be designated by the score, by the musical genre, or in some other way), a musician can know for how long to hold the note or rest.

Learning to read and play such rhythmic patterns can generally follow multiple stages. In one stage, a musician learns the notations and their denotations. For example, a beginner-level musician may learn about quarter notes, the relationship between the duration of a quarter note and the duration of a measure based on one or more time signatures, the relative duration of the quarter note to other elements in a measure or piece, etc. In another stage, the musician may learn to play a quarter note, such as by practicing the feel of playing a quarter note at one or more tempos. In another stage, the musician may learn and practice rhythmic patterns involving quarter notes and other musical elements (e.g., quarter rests, half notes, etc.). In another stage, the musician may learn to play the rhythmic patterns in context of musical compositions involving additional musical features, such as pitch, dynamics, etc. Even more advanced players may encounter difficult and/or unfamiliar rhythmic patterns, and they may revisit one or more of the same stages.

Many conventional techniques have been used by music students over centuries to learn rhythmic elements and patterns. More recently, some computer-based music training applications have incorporated similar techniques to allow students to learn music without a live teacher. Some such applications train users to play pieces of music, where rhythm is learned only in context of the particular piece. For example, a recording of a piece plays for the user as a small portion of a musical score (e.g., one or two measures of a musical score), and a user tries to copy what she hears, including pitches and rhythms. Even though such applications can help the student learn the particular piece, the student may struggle to translate or expand that knowledge to new pieces and/or new rhythms; the student may find that each new piece is a new mimicking exercise. Further, users of such applications may learn to play a large number of pieces while only encountering a relatively small variation in rhythms. Other such applications teach rhythm decontextualized from any piece of music. For example, a recorded rhythmic pattern is played by itself, in synch with a flashing graphic, etc.; and the user is prompted to repeat back the rhythmic pattern via an interface. Even though such applications can help the student improve their rhythmic recall and can efficiently provide users with a large variety of rhythmic patterns, students of such applications may never learn how such rhythms are notated in context of a piece of music. These and other conventional music training applications tend to be limited in their ability to provide students (particularly more advanced students) with effective rhythmic training that is contextualized to standard sheet music notations of pieces of music.

SUMMARY

Embodiments of the present invention relate to automated musical-score-referenced evaluation of haptic-based rhythmic performance. An audiovisual representation of real-time progress through a musical score is output to a user. The output corresponds to progress through a sequence of score-notated rhythm (SNR) events at a tempo. During the outputting, haptic performance (HP) events are received from a user via a haptic interface as the user's rhythmic performance of the SNR events at the tempo. Automated techniques evaluate the user's performance to determine a rhythmic compatibility between the received HP events and evaluation data for the SNR events. Visual feedback is provided to the user to graphically map the evaluated performance to the SNR events on the musical score.

According to one set of embodiments, a method is provided for haptic-based evaluation of musical-score-referenced rhythmic performance. The method includes: outputting, via an output device interface of a computational device, an audiovisual representation of real-time progress through a musical score at a tempo, the musical score including a musical notation representation of each of a sequence of score-notated rhythm (SNR) events, each SNR event having a stored logical definition that includes an associated SNR onset time and an associated SNR offset time; obtaining, during the outputting, a plurality of haptic performance (HP) events corresponding to user interactions with a haptic device interface of the computational device representing rhythmic performance by the user of the musical score at the tempo, each HP event having an associated HP onset time and an associated HP offset time; generating, by a rhythm evaluator subsystem in communication with the output device interface and the haptic device interface, evaluation data for the plurality of SNR events by: obtaining, for each SNR event of the plurality of SNR events, associated evaluation criteria for the SNR event based on the associated SNR onset time and the associated SNR offset time; and comparing the associated evaluation criteria for each SNR event with the associated HP onset time and the associated HP offset time of each of at least some of the plurality of HP events, the comparing identifying a plurality of matching events as those of the HP events each determined to temporally correspond to one of the plurality of SNR events, and evaluating a rhythmic compatibility between each of the plurality of matching events and the temporally corresponding one of the plurality of SNR events; and displaying, via the output device interface, visual feedback to graphically map the evaluation data for the plurality of SNR events to the musical notation representations of the plurality of SNR events on the musical score.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

Figure 1:
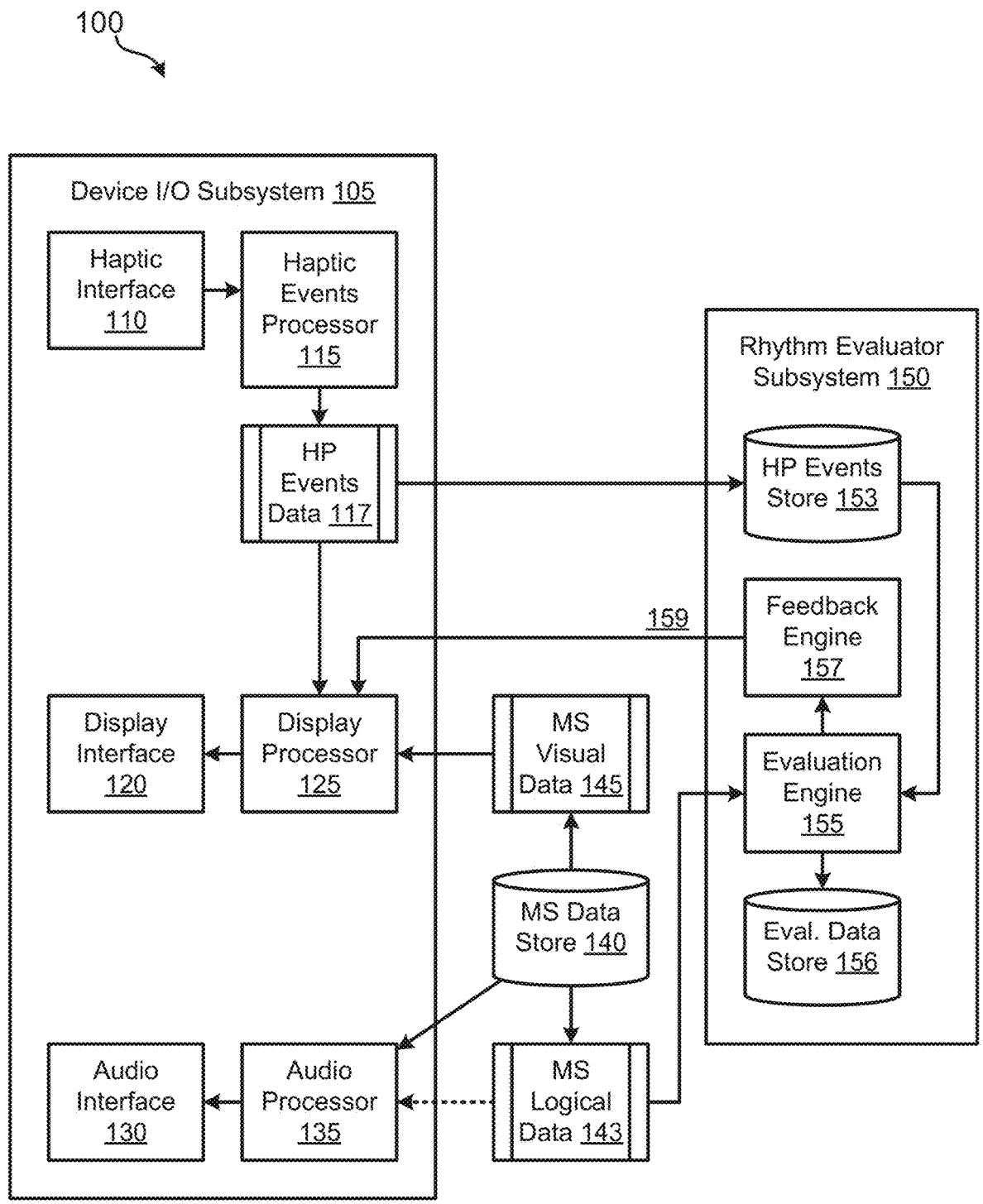
FIG. 1 shows an illustrative haptic rhythm training system, according to various embodiments described herein.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

The ability to sight read musical rhythms is a critical skill at all levels of musical education. A typical musical score includes notations of musical events over linear time. Musical sight reading involves real-time performance of those musical events. For example, a typical musical score can include one or more musical staves that locate at least notes (generally designations of filled musical space, such as by a pitch) and rests (generally designations of empty musical space, such as by silence). For most musical instruments, the vertical dimension on the staff relates to pitch, and the horizontal dimension on the staff relates to time. The musical score can additionally include designations of time signature, key signature, dynamics, and/or many other musical features.

As used herein, notes and rests, as notated on a musical score, are referred to as score-notated rhythm (SNR) events. Each SNR event can include an associated SNR onset time and an SNR offset time. As used herein, "onset time" is the time at which a rhythmic event begins, and "offset time" is the time at which a rhythmic event ends. Relative horizontal placement of an SNR event on a staff can indicate the SNR onset time, and standard notation symbology designates the duration of the SNR event, thereby indicating the SNR offset time. Standard musical notation includes a large symbology for designating SNR events. For example, various symbols are used to indicate that a note or rest consumes the duration of a whole note, half note, quarter note, eighth note, dotted quarter note, double-dotted quarter note, triplet eighth note, a quarter note tied to a sixteenth note, etc. The played duration of an SNR event can be determined by a combination of the notated duration (e.g., quarter note) and a tempo (e.g., in beats per minute). In some cases, the played duration is determined by additional and/or alternative factors, such as musical genre, time signature, and additional score markings (e.g., indicating to play a particular passage more quickly, to gradually slow down over a passage, etc.). By recognizing and understanding all of the rhythmic symbology, a musician can know when to play each SNR event and for how long to hold each SNR event, thereby translating the notated music into played music.

The ability to translate notated SNR events into played SNR events, particularly in real-time, can involve extensive training and practice. Even seasoned musicians can struggle to play rhythmic patterns that are complex and/or unfamiliar. Embodiments herein provide novel techniques for providing rhythmic training to musicians by providing real-time, score-referenced association between application-provided SNR events and user-provided haptic performance (HP) events. An audiovisual representation of real-time progress through a musical score (including progress through a sequence of SNR events at a tempo) is output to a user. In some implementations, the tempo is controllable by a user. For example, the user can use a slider bar, or any other suitable interface control to make the tempo faster or slower. Meanwhile, HP events are received from the user corresponding to user interactions with a haptic device interface representing rhythmic performance by the user of the SNR events at the tempo. The user's performance is evaluated to determine a rhythmic compatibility between the received HP events and evaluation data for the SNR events, and visual feedback is provided to the user to graphically map the evaluated performance to the SNR events on the musical score.

Turning first to FIG. 1, an illustrative haptic rhythm training system 100 is shown, according to various embodiments described herein. The system 100 includes a device input/output (I/O) subsystem 105, a rhythm evaluator subsystem 150, and a musical score (MS) data store 140. Embodiments of the device I/O subsystem 105 include a haptic interface 110 with a haptic events processor 115, a display interface 120 with a display processor 125, and an audio interface 130 with an audio processor 135. Embodiments of the system 100 are implemented on a computational device. In some embodiments, the computational device is a portable electronic device, such as a laptop computer, a tablet computer, a smartphone, etc. In other embodiments, the computational device is an appliance, such as a desktop computer. In other embodiments, the computational device is integrated with a musical instrument, such as in an electric piano.

Embodiments of the haptic rhythm training system 100 provide a rhythm training environment based on detecting and evaluating rhythmic correspondence between a user's rhythmic performance (based on detected haptic performance (HP) events) and audiovisual representation of real-time progress through a sequence of score-notated rhythm (SNR) events as notated on a musical score. Details of the music score, including the sequence of SNR events, are stored by the MS data store 140. As illustrated, the MS data store 140 stores at least MS visual data 145 and MS logical data 143. In some embodiments, the MS visual data 145 includes all information used by the display processor 125 to generate graphical score representations, including graphical representations of SNR events, for visual output by the display interface 120. For example, the MS visual data 145 includes a stored graphical representation of the score, including notes and rests, and including any additional graphical score elements (e.g., staff lines, measure lines, clefs, accidentals, time signatures, key signatures, dynamic markings, tempo markings, expressive markings, titles, lyrics, etc.). In other embodiments, the MS visual data 145 includes only a portion of the information used by the display processor 125 to generate visual output of the musical score by the display interface 120. For example, the MS visual data 145 includes score elements other than notes and rests, and the display processor 125 generates visual representations of the notes and rests based on MS logical data 143 for the SNR events.

The MS logical data 143 logically defines at least a sequence of SNR events, indicating at least an associated SNR onset time and an SNR offset time for each SNR event. In some implementations, the MS logical data 143 for each SNR event includes a type identifier, indicating whether the SNR event indicates filled musical space (e.g., a note) or empty musical space (e.g., a rest). In some implementations, the MS logical data 143 includes other information relating to the particular SNR event, such as pitch for a note, whether the SNR event is part of a triplet or other grouping, whether the SNR event is associated with a particular hand or finger, etc.

In some embodiments, the MS logical data 143 is score-referenced, such that SNR onset time and/or SNR offset time (and/or SNR duration) is defined in relation to notation on the underlying musical score. The relationship to the score can be based on the type of note or rest (e.g., "quarter note"), a consumed fraction of a measure or measures (e.g., half of a measure), a number of metronome beats (e.g., three beats), etc. In an example SNR event, an SNR onset time is indicated as occurring at the second beat of the fourth measure, and the SNR offset time is indicated as occurring at the fourth beat of the fourth measure. Additional MS logical data 143 can be used to convert the SNR offset time to a duration, if needed. For example, MS logical data 143 indicates that the musical score is in "4/4" time, from which it can be derived that the example SNR event is a half note. Additionally or alternatively, the SNR offset time can be indicated in the score-referential MS logical data 143 as a duration. Referring to the same example SNR event, the MS logical data 143 can indicate that the SNR event has a duration of two beats, or that the SNR event is a half-note. In such cases, the SNR offset timing can be derived, if desired, by adding the explicitly indicated duration to the SNR onset time. In each case, a tempo can be used to convert the score-referenced MS logical data 143 into real-time-referenced timing information. For example, additional MS logical data 143 indicates a default tempo of 120 beats per minute, such that a score-referenced half-note would consume approximately one second of real time in the default tempo. Score-referenced definition of MS logical data 143 provides various features. For example, the real-time durations of all SNR events can automatically be adjusted along with changes in tempo.

Alternatively, MS logical data 143 can be real-time-referenced. In one implementation, each SNR event is defined as beginning (i.e., SNR onset time) some number of milliseconds from the beginning of the composition and as ending (i.e., SNR offset time) some number of milliseconds from the beginning of the composition. In another implementation, each SNR event is defined as beginning (i.e., SNR onset time) some number of milliseconds from the beginning of the composition and as ending (i.e., SNR offset time) some number of milliseconds after the SNR onset time. Regardless of whether the MS logical data 143 is score-referenced or real-time-referenced, SNR offset times either be defined as an associated ending time for an SNR event, or as a duration following an associated SNR onset time for the SNR event.

As described herein, embodiments of the rhythm evaluator subsystem 150 may evaluate a user's rhythmic performance only in relation to limited SNR event information. In some embodiments, the rhythm evaluator subsystem 150 evaluates only relative to SNR onset times and SNR offset times. In other embodiments, the rhythm evaluator subsystem 150 evaluates further based on whether an SNR event is a note or a rest. In other embodiments, the rhythm evaluator subsystem 150 evaluates further based on whether an SNR event is associated with a particular hand, finger, etc. For example, in these embodiments, the rhythm evaluator subsystem 150 can evaluate user performance without considering pitch, dynamics, key signature, etc. As such, embodiments of the MS logical data 143 only include information useful for rhythmic evaluation by the rhythm evaluator subsystem 150. In some such embodiments, the display processor 125 generates graphical representations of musical scores and SNR events based only on MS visual data 145, without any processing of MS logical data 143. In other such embodiments, the display processor 125 partially generates graphical representations of SNR events based on MS logical data 143 (e.g., such as determining horizontal placement of notes and rests corresponding to the SNR events based on SNR onset times, determining note or rest types based on SNR offset times, etc.), while remaining graphical representations of musical score and/or SNR event elements are generated from MS visual data 145. For example, the MS logical data 143 is used to determine timing related information for an SNR event, and MS visual data 145 is used to determine pitch, etc. Some embodiments of the display processor 125 include a notation rules engine (not shown) that can derive additional information from the MS visual data 145 and/or from the MS logical data 143 that can be used to generate graphical representations of musical score and/or SNR event elements. For example, the notation rules engine may determine whether a note has a flag, whether notes are tied together across a measure boundary, whether a note stem is pointing up or down, whether an accidental is shown, etc.

Embodiments of the display interface 120 and the display processor 125 are implemented in any suitable manner that supports visual portions of the audiovisual output features described herein. The terms "visual" and "graphical" are used interchangeably herein. The display interface 120 can be implemented by any suitable display components, such as by a tablet computer display, a smartphone display, a computer monitor, etc. The display processor 125 can be implemented as any processor, portion of a processor, or group of processors capable of generating graphical outputs via the display interface 120, as described herein. For example, the display processor 125 can be implemented by a central processing unit (CPU), a graphics processing unit (GPU), etc. In some implementations, a touchscreen interface integrates the display interface 120 and the haptic interface 110. As described above, the display processor 125 can use the MS visual data 145 (e.g., and the MS logical data 143) to generate a graphical representation of a musical score, including graphical representations of the sequence of SNR events to be performed by a user.

Embodiments of the display processor 125 provides additional features. Some such features involve generating display outputs to graphically represent real-time progress through the musical score, such as by graphically indicating a current playback position. Other such features involve generating display outputs to graphically represent evaluation feedback. These and other features of the display interface 120 and the display processor 125 are described further below.

Embodiments of the audio interface 130 and the audio processor 135 are implemented in any suitable manner that supports aural portions of the audiovisual output features described herein. The terms "aural" an "audio" are used interchangeably herein. The audio interface 130 can be implemented by any suitable audio components, such as by one or more audio transducers, speakers, headphones, etc. The audio processor 135 can be implemented as any processor, portion of a processor, or group of processors capable of generating audio outputs via the audio interface 130, as described herein. In some embodiments, the audio representations of the SNR events are dynamically generated from the MS logical data 143. In some such embodiments, audio representations of the sequence of SNR events indicate only the SNR onset times, such as by buzzing, vibrating, or clicking at each SNR onset time. In other such embodiments, audio representations further indicate SNR offset times for the SNR events (e.g., the audio interface 130 buzzes or vibrates for the duration between the SNR onset and the SNR offset of each SNR event). In other such embodiments, where the MS logical data 143 includes additional audio information, the audio representations of the SNR events indicates the further audio information, such as pitch, dynamics, etc. In other embodiments, the audio representations of the SNR events are generated from recorded audio. For example, the sequence of SNR events is played back by playing back a digital audio file from the MS data store 140 that stores a recording of the musical composition.

Embodiments of the audio processor 135 provide additional features. Some such features involve generating additional audio during a user performance, such as outputting a metronome and/or a backing track to indicate tempo. Other such features involve generating audio outputs to play back portions of a user's performance, such as for comparison with playback of an ideal version of the composition, a recorded version of the composition, a past performance by the user, etc. These and other features of the audio interface 130 and the audio processor 135 are described further below.

As described above, embodiments of the system 100 evaluate a user's rhythmic performance by obtaining haptic feedback from the user via the haptic interface 110 while the audiovisual representation of the musical score is being presented to the user via the display interface 120 and the audio interface 130. The audiovisual representation shows real-time progress through the musical score at a particular tempo, such as by sequentially highlighting each of the sequence of SNR events in its proper timing based on its notated rhythm and the playback tempo. The haptic feedback corresponds to the user's interactions with the haptic interface 110 representing the user's rhythmic performance of sequence of SNR events of the musical score at the playback tempo. The haptic feedback is recorded as a sequence of haptic performance (HP) events.

The haptic interface 110 can be implemented using any sensors capable of receiving the HP events from the user, such that each HP event includes both an HP onset time and an HP offset time. In some implementations, the haptic interface 110 is implemented by touch sensor features of a touchscreen interface of the computational device. For example, a user touches the touchscreen, and the haptic events processor 115 detects and records the touch event as a haptic event. In other implementations, the haptic interface 110 is implemented by an input device integrated with the computational device. For example, a user touches a trackpad, squeezes a force sensor, clicks on an integrated mouse button, presses an integrated keyboard key, presses a key of an electric piano keyboard, etc.; and the haptic events processor 115 detects and records the user interaction as a haptic event. In other implementations, the haptic interface 110 is implemented by a peripheral input device in communication (e.g., via a wired or wireless connection) with other portions of the computational device. For example, a user clicks a button on a peripheral mouse or keyboard, squeezes a peripheral haptic glove, presses a key of an external electric piano keyboard, etc.; and the haptic events processor 115 detects and records the user interaction as a haptic event. While embodiments described herein generally describe haptic interfaces 110 that interface with a user's hands or fingers, other types of haptic interfaces 110 can be used. For example, a haptic interface 110 can interface with a user's foot, a user's breath, etc.

In some implementations, information received from the haptic interface 110 can be supplemented with additional inputs received via other inputs. For example, in addition to (e.g., concurrent with) interacting with the haptic interface 110, a user can also clap, snap, whistle, sing, tap a foot, etc. Such additional interactions can be detected by audio and/or video inputs (e.g., microphone, camera, etc.) and processed. In some cases, such additional interactions can be used to set an initial tempo for a performance, to receive additional commands during a user performance, to help validate haptic feedback (e.g., to improve a confidence determination), etc.

In any of the above or other implementations, the haptic interface 110 is implemented so that the user has control over the HP onset time and the HP offset time. In some such implementations, the user begins engagement with the haptic interface 110 to establish the HP onset time for an HP event, maintains the engagement with the haptic interface 110 for some duration, and releases the engagement from the haptic interface 110 to establish the HP offset time. For example, the user places a finger on a touchscreen interface (e.g., or depresses a key or button, etc.) to define the HP onset time and removes the finger from the touchscreen interface (e.g., or releases the key or button, etc.) to define the HP offset time. Other implementations can provide alternative manners of indicating an HP offset time. For example, after engaging with the haptic interface 110 to establish an HP onset time for an HP event, the user can establish the HP offset time by engaging with the haptic interface 110 again (i.e., a first touch or click indicates the start of the HP event and a second touch or click indicates the end of the HP event), by engaging with a different portion of the haptic interface 110 or with a different haptic interface 110, etc. In some embodiments, the HP onset time and the HP offset time are defined in opposite manners. For example, the haptic interface 110 and/or the haptic events processor 115 can be configured so that disengagement with the haptic interface 110 indicates an HP onset time and engaging with the haptic interface 110 indicates a corresponding HP offset time.

In some embodiments, the haptic interface 110 and the haptic events processor 115 are configured to obtain multiple concurrent tracks of HP events. As one example context, a piano student may desire to learn a musical composition having notated right-hand portions and left-hand portions to be played concurrently with different rhythms. As another example context, a piano student may desire to practice a rhythmically complex passage of a musical composition in which different fingers are playing in different rhythms (e.g., some fingers hold particular notes while other fingers on the same hand change to different notes). In some implementations, a single haptic interface 110 is capable of concurrently receiving the multiple tracks of HP events. For example, a multi-touch touchscreen interface, a multi-key keyboard, a multi-button mouse, or the like can receive multiple concurrent haptic interactions. In other implementations, multiple haptic interfaces 110 are used concurrently to receive the multiple concurrent haptic interactions.

In some embodiments, additional haptic information can be detected and/or haptic feedback can be used for additional purposes. As described above, some embodiments of the rhythm evaluator subsystem 150 evaluate user performance only based on onset and offset timing, without considering pitch, dynamics, key signature, etc. In other embodiments, additional haptic interactions can be detected. For example, a touchscreen or other haptic interface 110 may detect how hard a user is pressing; or a haptic glove, three-dimensional mouse or controller, or other haptic interface 110 may detect velocity, acceleration, orientation, three-dimensional gestures, etc. In some implementations, such additional haptic interactions can be used by the rhythm evaluator subsystem 150 to evaluate dynamics, and/or other characteristics of the user's performance. In some embodiments, HP events described above and/or such additional haptic interactions can be used for purposes other than rhythmic evaluation, such as for user interface navigation, playback control, etc. For example, a user may tap on the haptic interface 110 at a particular rate prior to the start of a performance to set a performance tempo, or the user may tap each finger on the haptic interface 110 prior to a performance to calibrate the haptic interface 110 to finger locations, sensitivity levels, etc.

User interactions with the haptic interface 110 (e.g., whether one at a time, or multiple concurrently) are detected by the haptic events processor 115, and the haptic events processor 115 generates HP events data 117. In some implementations, the HP events data 117 represents a sequence of HP events, each having an associated HP onset time and an associated HP offset time. In other implementations, the HP events data 117 represents a sequence of HP onset times and HP offset times from which a sequence of HP events can be derived. For example, where only a single track of HP events is received, each sequential pair of HP onset time and HP offset time can be treated as defining the start and end, respectively of an associated HP event.

Embodiments of the haptic events processor 115 can use various approaches to recognize multiple concurrent tracks of HP events. In some implementations, where multiple haptic interfaces 110 are used, user interactions with each haptic interface 110 is labeled based on its originating haptic interface 110 (e.g., based on a logical port through which the haptic data is received). In other implementations, where a single haptic interface 110 is used, the haptic interface 110 provides additional data that can be used by the haptic events processor 115 to separate the tracks. In some such implementation, where the haptic data is coming from a multi-key or multi-button haptic interface 110, the haptic events processor 115 can group user interactions by keys or button to separate concurrent HP events. For example, on a typing keyboard, a user depresses the 'S' key at time T0, depresses the 'K' key at time T1, releases the 'K' key at time T2, and releases the 'S' key at time T3. If only a single sequence is maintained (HP onset at T0, HP onset at T1, HP offset at T2, HP offset at T3), there would be no way to know at T2 whether the HP offset is associated with the first or the second HP onsets. By also recording the associated key, the haptic events processor 115 can group the HP onset at T0 with the HP offset at T3 as both involving the 'S' key, and the haptic events processor 115 can group the HP onset at T1 with the HP offset at T2 as both involving the 'K' key. In other such implementation, where the haptic data is coming from a multi-touch interface (e.g., a multi-touch touchscreen or trackpad), the haptic events processor 115 can group HP onset times and HP offset times to separate concurrent HP events based on a location or region of the multi-touch interface at which each user interaction occurs. As one example, a user concurrently uses both hands, and/or multiple fingers, to interact with a touchscreen, thereby inherently generating multiple concurrent interactions with different location of the touchscreen; and the haptic events processor 115 can group those interactions by location to determine which HP onset times and which HP offset times to pair. As another example, separate regions of a touchscreen are predesignated (e.g., labeled, color-coded, etc.) to accept respective tracks of HP events (e.g., a right-hand region and a left-hand region), and the haptic events processor 115 is configured to process interactions from each region in association with its predesignated track.

In some embodiments, an HP onset time always indicates the start of a user interaction with the haptic interface 110, and the HP offset time always indicates the end of the user interaction with the haptic interface 110. In some such embodiments, a "note" event (whether an SNR event or an HP event) is identified as an onset time followed by a corresponding offset time, and a "rest" event (whether an SNR event or an HP event) is identified as an offset time followed by a corresponding onset time. In other embodiments, a note HP event is characterized by an onset time followed by an offset time, and a rest event is characterized by an offset time followed by a corresponding onset time.

Embodiments send the generated HP events data 117 to an HP events store 153. For example, the haptic events processor 115 can include a local buffer that records detected haptic events, and the haptic events processor 115 outputs the HP events data 117 as one or more tracks of sequences of HP events and/or sequences of HP onset times and HP offset times. In some implementations, the HP events store 153 is implemented in the device I/O subsystem 105, such as integrated with the haptic events processor 115. In other implementations, as illustrated, the HP events store 153 is implemented in the rhythm evaluator subsystem 150. In other implementations, the HP events store 153 is implemented as part of a storage subsystem (not shown) that includes the HP events store 153 and the MS data store 140. The HP events store 153 can be implemented using any suitable data storage, such as solid-state storage, hard-disk storage, removable medium storage, networked (e.g., local network, cloud-based, etc.) storage, etc. Further, the HP events data 117 can be stored by the HP events store 153 in any suitable manner, such as in a flat file data structure, a hierarchical data structure, etc.

Embodiments of the rhythm evaluator subsystem 150 evaluate the user's performance (i.e., the HP events data 117 obtained and stored in the HP events store 153) based on how accurately the user's performed rhythm corresponds to the rhythm represented by the sequence of SNR events as notated in the musical score. Embodiments of the rhythm evaluator subsystem 150 include an evaluation engine 155 and a feedback engine 157. The evaluation engine 155 generates evaluation data based on comparing the performance data from the HP events store 153 with the SNR data as represented by the MS logical data 143. The evaluation data is used by the feedback engine 157 to generate feedback data 159. The feedback data 159 can include micro-level feedback and macro-level feedback. The feedback data 159 can be used by the display processor 125 to generate graphical performance feedback to be output to the user via the display interface 120.

In some embodiments, the evaluation engine 155 performs its evaluation by iterating through each of the sequence of SNR events. For each SNR event, the evaluation engine 155 seeks to find a matching one of the HP events (i.e., the HP event representing the user's attempt to perform the corresponding SNR event) and to determine how accurately the matching HP event matches the rhythm of the corresponding SNR event (e.g., its SNR onset time and/or SNR offset time). Timing of the HP events is recorded with reference to a performance time basis. For example, each HP onset time and HP offset time is represented by a timestamp that is some temporal distance (e.g., in milliseconds) from a start of the performance. The performance time basis can be the same as the real-time-reference basis described above, or any other suitable time basis. As described above, some embodiments include score-referenced MS logical data 143. Such embodiments can convert the score-referenced MS logical data 143 to the performance time basis. For example, the score-referenced MS logical data 143 is converted to real-time-referenced MS logical data 143; and, if needed, the real-time-referenced MS logical data 143 is further temporally aligned relative to the performance time basis (or vice versa).

The evaluation engine 155 can obtain a set of evaluation criteria for each of the SNR events. The evaluation criteria can be formulated as processor-readable evaluation functions, such as if-then statements, matching functions, etc. Some or all of the evaluation criteria can be stored as part of the MS logical data 143 for the SNR events, and/or some or all of the evaluation criteria can be derived based on predetermined thresholds and/or rules. One type of evaluation criteria is a "valid match window." The valid match window is a temporal window referenced to the SNR onset time of each SNR event. In some implementations, the valid match window is symmetric about the SNR onset time, such as a 100-millisecond window extending 50 milliseconds to either side of the SNR onset time. In other implementations, the valid match window is asymmetric, such as a 100-millisecond window beginning 25 milliseconds before the SNR onset time and ending 75 milliseconds after the SNR onset time. In some implementations, the valid match window is real-time-referenced with a predefined, fixed size. For example, the valid match window is always 100 milliseconds and is always symmetric about the SNR onset time for all SNR events. In some implementations, the valid match window is score-referenced and rule-based. In one such implementation, the valid match window is defined as function of (e.g., a fraction or percentage, or some formulaic relation to) a beat. For example, the valid match window shrinks at faster tempos. In another such implementation, the valid match window is defined as function of a skill level of the user and/or a difficulty level of the musical score. For example, the valid match window is more forgiving for less advanced players and/or for simpler scores.

As noted above, the evaluation engine 155 can seek, for each SNR event, to find a matching HP event (representing the user's performance of the SNR event). Embodiments of the evaluation engine 155 can search through the HP events in the HP events store 153 to determine whether any of the obtained HP events is a "matching event," meaning that the HP event has an HP onset time that is within the valid match window for the SNR event. In some implementations, if multiple HP events are found to have HP onset times within the valid match window, the evaluation engine 155 selects the HP event with the HP onset time closest to the SNR onset time as the matching event. Some embodiments iterate through all SNR events in the MS data store 140 to look for matching HP events. Other embodiments may ignore some of the SNR events in the MS data store 140. For example, if the musical score includes certain types of musical groupings (e.g., quintuplets) and/or certain expressive designations (e.g., a tempo rubato passage), the SNR events relating to those portions of the musical score can be ignored or treated differently.

For each evaluated SNR event, the evaluation engine 155 either finds a matching HP event, or it does not. In a case where no matching HP event is identified (i.e., there is no HP event having an HP onset time within the valid match window of the SNR event), the SNR event can be tagged as a "skipped event." In a case where a matching HP event is identified (i.e., there is an HP event having an HP onset time within the valid match window of the SNR event), the matching HP event can be associated with the SNR event. Such tagging can be implemented in any suitable manner, such as by setting a flag associated with the SNR event, storing a label in association with the SNR event, etc. In some embodiments, the rhythm evaluator subsystem 150 includes an evaluation data store 156 for storing evaluation results. For example, the additional storage can be used to store an instance of each evaluated SNR event along with its generated evaluation data (e.g., tags, labels, etc.), and/or to store the evaluation data with pointers or other identifiers that link the evaluation data to corresponding ones of the SNR events stored in the MS data store 140.

In a case where a matching HP event is identified (i.e., there is an HP event having an HP onset time within the valid match window of the SNR event), the matching HP event can be associated with the SNR event. Each matching event (or matching HP event) is the one of the HP events determined to temporally correspond to one of the SNR events. Such an association can be implemented by storing a pointer between the matching HP event and the evaluated SNR event, or in any other suitable manner. Each matching event is the one of the HP events determined to temporally correspond to one of the SNR events.

For each matching HP event, the evaluation engine 155 can then evaluate a rhythmic compatibility between the matching HP event and the temporally corresponding one of the SNR events. The rhythmic compatibility can be based on one or more of at least three rhythmic characteristics of the SNR event: onset compatibility as between the HP onset time and the SNR onset time, offset compatibility as between the HP offset time and the SNR offset time, and/or duration compatibility as between the duration of the HP event (i.e., the temporal distance between the HP onset time and the HP offset time) and the duration of the SNR event (i.e., the temporal distance between the SNR onset time and the SNR offset time). In some embodiments, the rhythmic compatibility between the matching HP event and the temporally corresponding SNR event is expressed as a score that is functionally related to the temporal distance between the characteristics. For example, a high onset compatibility score indicates a small temporal distance between the HP onset time and the SNR onset time. The scoring can be different for different characteristics. In other embodiments, the rhythmic compatibility between the matching HP event and the temporally corresponding SNR event is expressed categorically based on one or more predetermined thresholds. For example, onset compatibility is determined to be "good" or "bad" (or "high," "medium," and "low"; etc.) by determining whether the temporal distance between the HP onset time and the SNR onset time is more or less than the predetermined threshold or thresholds. The predetermined one or more thresholds can be different for different characteristics.

As noted above, the evaluation engine 155 can obtain a set of evaluation criteria for each of the SNR events. The evaluation criteria can include setting valid windows, evaluation thresholds, scoring, and/or other parameters for evaluating rhythmic compatibility. In some embodiments, the evaluation criteria are generated based on predefined and fixed settings. For example, as noted above, a valid match window can be defined as a fixed time window relative to an SNR onset time. In other embodiments, some or all evaluation criteria are rule-based. Such rule-based evaluation criteria can be used to adjust the evaluation of rhythmic compatibility based on tempo, user skill level, difficulty level of the musical score or passage, SNR event type, and/or other additional information. For example, the valid match window can be adjusted so that matching HP events are identified more or less strictly depending on tempo, note type, etc.

As another example, the evaluation criteria can be set so that rhythmic compatibility of note SNR events is evaluated based on stricter onset compatibility and looser offset compatibility, while rhythmic compatibility of rest SNR events is evaluated based on stricter onset compatibility and stricter offset compatibility. As another example, evaluation criteria can be used to set a valid offset window. The valid offset window can define a window in which to evaluate offset compatibility for the HP offset time of a matching HP event and/or in which to evaluate duration compatibility for the duration of the HP event. For example, the valid offset window can determine an appropriate HP offset time and/or HP event duration as a temporal distance from the HP onset time based on whether the corresponding SNR event is a staccato note, a legato note, a rest, etc.

Evaluation criteria can also be formulated and applied by the rhythm evaluator subsystem 150 to handle special cases. One category of special cases involves musically relevant groupings of SNR events. One example of a musically relevant grouping is a chord. In some cases, the rhythm evaluator subsystem 150 evaluates the chord as a single SNR event. For example, the chord can be stored with a single set of MS logical data 143, or can be otherwise treated as a single event, with a single SNR onset time, single SNR offset time, single duration, etc. In other cases, such as where a multi-touch haptic interface 110 is used to obtain multiple concurrent tracks of HP events representing multiple fingers of a hand, or the like, each note of the chord can be treated as a separate SNR event. For example, in some musical compositions, one or more notes of a chord are held while others are released (e.g., notated by using one stem direction for one or more held notes and another stem direction for one or more moving notes).

Another example of a musically relevant grouping is a "quintuplet" (a grouping of five sixteenth notes to be performed within the span of one quarter note), or any other grouping of some number of notes to be played in a defined number of beats. One implementation can treat each note of the grouping as any other note, having its own SNR onset time and SNR offset (and/or SNR event duration) based on evenly spacing each note to consume precisely a respective fifth of the quarter-note duration. In such an implementation, each note can be evaluated for rhythmic compatibility, such as by the evaluation engine 155 seeking a matching HP event. Other implementations can treat the entire grouping as an SNR event (e.g., instead of, or in addition to storing each component of the grouping as SNR events). In one such implementation, the evaluation engine 155 can look for an appropriate set of component HP events (e.g., five note HP events) as a matching event by determining whether the set of component HP events begins within a valid match window of the grouping SNR event and all falls within a valid offset window for the grouping SNR event (e.g., corresponding to a total duration of the quintet). Similar approaches can be applied to other types of musically relevant groupings, such as treatment of grace notes, trills, mordents, glissandos, etc.

Another category of special cases involves expressive notations. One example is a passage marked on a score as "tempo rubato," which indicates that the passage should be played freely. In some cases (e.g., for some genres, composers, etc.), such a tempo rubato passage may indicate that the performer is completely free from rhythmic constraint. In some such cases, embodiments can set evaluation criteria to ignore those SNR events falling within the tempo rubato section when performing rhythmic evaluation. For example, those SNR events can be specially tagged or labeled as such. In other such cases, the evaluation engine 155 uses pattern matching to determine which set of HP events represents the user's performance of the tempo rubato passage in order to correct for subsequent timing. Such pattern matching can involve counting a number of HP events corresponding to a number of SNR events in the passage, attempting to match relative durations of HP events to different durations of SNR events in the passage, etc. By using such a pattern matching approach, the evaluation engine 155 can shift the performance time basis subsequent to the passage (i.e., shift the timing of HP events following the tempo rubato passage) so that HP events can be properly matched to temporally corresponding SNR events after the tempo rubato passage, regardless of how long the performer spent playing the passage.

In other cases, even though a passage is marked as rubato, certain rhythmic constraints are expected. For example, performing a tempo rubato section of a certain composition may involve maintaining strict adherence to rhythm in the left hand while playing in a more rhythmically free manner in the right hand. As another example, some composers or genres intend for a tempo rubato passage to be played with a fixed overall duration (e.g., to consume a total number of seconds, a total number of beats or measures, etc.), even though individual notes within the passage can be sped up or slowed down in an individualistic and expressive manner. In such cases, embodiments can set stricter evaluation criteria for passage-level rhythmic evaluation, while setting looser or no evaluation criteria for note- or rest-level rhythmic evaluation. In one such case, the evaluation criteria are defined so that the evaluation engine 155 can search for a matching set of HP events, such that a first of the matching set of HP events has good onset compatibility with the SNR onset time of the first SNR event of the passage, a last of the set of matching HP events has good offset compatibility with the SNR offset time of the last SNR event of the passage, and the number of HP events in the set of HP events is within a predetermined threshold amount (e.g., number, percentage, etc.) of the total number of SNR events in the passage. In another such case, the evaluation criteria include further note-or-rest-level definition. For example, the evaluation criteria look for onset compatibility of each SNR event in the passage to determine whether any of the matching HP events were performed outside a predefined tolerance (e.g., having an HP onset time too far before or after the corresponding SNR onset time). Similar approaches can be applied to other types of expressive notations, such as treatment of fermatas, etc.

Based on the above, the evaluation engine 155 uses the evaluation criteria to generate evaluation data indicating at least the rhythmic compatibility between the user's performance and the sequence of SNR events (e.g., all of, or an evaluated portion of, the SNR events of the musical score). In some embodiments, the evaluation data is stored in the evaluation data store 156. Embodiments of the feedback engine 157 can then use the evaluation data (e.g., from the evaluation data store 156) to generate and output feedback data 159. In some embodiments, the feedback data 159 is generated to be usable by the display processor 125 to generate graphical performance feedback to be output to the user via the display interface 120. In some embodiments, the feedback engine 157 generates the feedback data 159 to be further usable by the audio processor 135 to generate audible performance feedback to be output to the user via the audio interface 130.

In some embodiments, the feedback data 159 is micro-level feedback that indicates event-wise rhythmic compatibility as a graphical overlay to the musical score. The term "graphical overlay" is used herein to generally include any type of concurrent graphical presentation that provides visual juxtaposition between the graphical feedback elements and the graphical score elements to which the feedback applies. For example, such a graphical overlay can include displaying a graphical feedback element in a semi-transparent manner over a graphical score element, recoloring (e.g., or changing line weight, etc.) a graphical score element to imply a graphical feedback element, adding text or images representing a graphical feedback element alongside a graphical score element, etc. In one implementation, SNR events are displayed on the musical score in a first color to indicate a skipped event (i.e., that no matching HP event was found), in a second color to indicate a well-played event (e.g., that a matching HP event was found, and the matching HP event has good onset, offset, and/or duration compatibility), and in a third color to indicate a poorly-played event (e.g., that a matching HP event was found, but the matching HP event has poor onset, offset, and/or duration compatibility). In another implementation, a first color is used to highlight portions of the musical score during which an SNR event should be played (e.g., from the SNR onset time to the SNR offset time for a particular note SNR event), a second color is used to highlight portions of the musical score during which a matching HP event was played well, and a third color is used to highlight portions of the musical score during which a matching HP event was played poorly. In another implementation, each SNR event is labeled with a score indicating the rhythmic compatibility evaluated for that SNR event. In another implementation, colors or other graphical elements are used further to overlay past performance data from the user or from other performers.

In other embodiments, the feedback data 159 is macro-level feedback that indicates performance-wise rhythmic compatibility. The macro-level feedback can be presented as a graphical overlay to the musical score, in a separate portion of the display, or in any suitable manner. In some such embodiments, the macro-level feedback indicates an overall performance score (e.g., in textual form and/or any other suitable form). For example, the feedback data 159 indicates that the performance had an overall rhythmic compatibility of 82 percent. In other such embodiments, the feedback engine 157 performs one or more statistical analyses on the evaluation data to look for patterns or trends, and the feedback data 159 indicates the results of those analyses. One such analysis indicates patterns of performance across passages and/or sections of the performance. For example, the feedback data 159 shows that the user performed well (i.e., had a high rhythmic correspondence) in measures 1-10, very poorly in measure 11-13, and moderately well for the remainder of the performance. Another such analysis matches performance patterns to predefined categories of performance. As one example, the feedback data 159 indicates that there was poor performance on rests, but not on notes (e.g., the analysis compares rhythmic correspondence for rest SNR events versus not SNR events). As another example, the feedback data 159 indicates that there was an overall tendency to play ahead of the beat or behind the beat (e.g., the analysis finds a statistical tendency for HP onset times to be ahead of SNR onset times, or delayed with respect to SNR onset times). As another example, the feedback data 159 indicates that there was a misunderstanding of certain musical notations (e.g., the analysis finds that two HP events are present even where two notes are tied together, indicating a misunderstanding of tying; that HP events matching triplets all seem to have the duration and spacing of eighth notes, indicating a misunderstanding of triplets: etc.). As another example, the feedback data 159 indicates that the performer appears not to have attempted some of the musical score (e.g., the analysis finds that HP events are missing for all of one of the hands in a two-handed piece, or for an entire section of the piece). As another example, the feedback data 159 indicates that the performer appears to struggle on certain types of passages (e.g., the analysis finds that rhythmic correspondence tends to be higher during faster or slower sections of the piece).

The above assumes that the rhythmic evaluation is performed from the direction of the SNR events, such as by attempting to match the user's performed HP events to the SNR events of the score. For example, each SNR is evaluated to find a matching HP event, or the event is considered to be skipped. Some embodiments of the rhythm evaluator subsystem 150 perform further and/or alternative evaluation from the direction of the HP events. In some such embodiments, HP events are analyzed to look for potential interface errors. For example, a glitch in a haptic interface 110, or slight movement of the user's hand or fingers on the haptic interface 110, may cause certain types of haptic events processors 115 to record more than one HP event, even though only a single HP event was intended by the performer. Some implementations can address such cases in pre-processing. The haptic events processor 115 can detect cases where the HP offset time of one HP events and the HP onset time of a next HP event are closer than a predetermined threshold, indicating that it is unlikely that a user intended separate events; and the haptic events processor 115 can treat those events as a single HP event (e.g., generate a single event in the HP events data 117, remove the data for the intermediate offset and onset times, etc.). Other implementations can address such cases in post-processing. For example, the evaluation engine 155 can detect a group (e.g., two, three, etc.) of sequential HP events, where the first HP event has high onset compatibility with the SNR onset time of an SNR event, and the last HP event has high offset compatibility with the SNR offset time of the same SNR event, and the group of sequential HP events have minimal spacing between them. Removing the unintended HP events data in these and other cases can be referred to as "deduplication."

In other such embodiments, the HP events are analyzed (e.g., by the evaluation engine 155) to evaluate non-matching (and not deduplicated) HP events. As one example, there may be more HP events than SNR events, but some or all of the extraneous HP events appear to have been performed intentionally by the user. Some embodiments of the evaluation engine 155 analyze those extraneous HP events to determine whether they represent a misunderstanding of certain notation conventions (e.g., tying of notes), whether they suggest an error in the processing of haptic information, whether it appears that the user was improvising or riffing for a time, etc. As another example, the evaluation engine 155 may determine that the number of SNR events identified as skipped events is similar to a number of HP events not identified as matching events (e.g., it is possible that an entire section of HP events was performed correctly relative to itself, but was somehow time-shifted relative to the SNR events). Embodiments of the evaluation engine 155 can identify such cases, and/or can attempt to remedy such cases (e.g., by using moving windows, or other pattern matching techniques to try to map the non-matching HP events to the missed SNR events).

Figure 2:
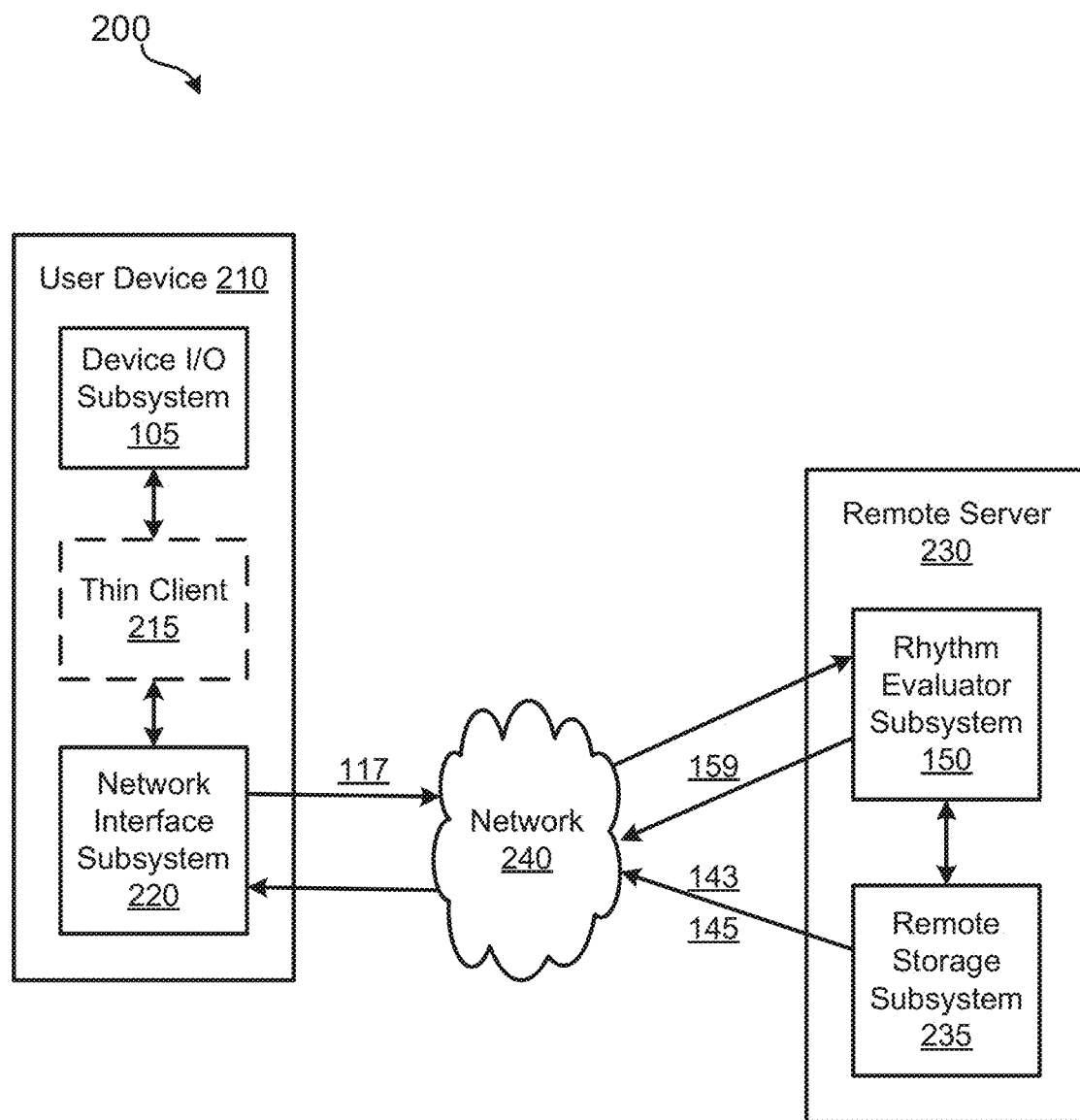
FIG. 2 shows another illustrative haptic rhythm training system implemented in a cloud-based environment, according to various embodiments described herein.

FIG. 2 shows another illustrative haptic rhythm training system 200 implemented in a cloud-based environment, according to various embodiments described herein. The system 200 includes one or more user devices 210 in communication with one or more remote servers 230 via one or more communication networks 240 (only a single instance of each is shown to avoid overcomplicating the illustration). Each user device 210 can implement a respective instance of the device I/O subsystem 105, a thin client 215, and a network interface 220. The one or more remote servers 230 implements the rhythm evaluator subsystem 150 and a remote storage subsystem 235. The remote storage subsystem 235 can include some or all of the MS data store 140, the HP events store 153, and the evaluation data store 156. For example, the remote storage subsystem 235 can be used to maintain records of historical performance data.

For example, during operation, a user uses the thin client 215 of the user device 210 to access an application that provides features of the rhythm evaluator subsystem 150 by communicating over the network(s) 240. Operation of the thin client 215 can involve communication of various types of data. For example, the MS visual data 145 and MS logical data 143 are received by the user device 210 from the remote storage subsystem 235 of the remote server(s) 230, HP events data 117 is communicated from the user device 210 back to the rhythm evaluator subsystem 150 of the remote server(s) 230, and feedback data 159 is received by the user device 210 from the rhythm evaluator subsystem 150 of the remote server(s) 230. Communications between the user device 210 and the remote server(s) 230 via the network(s) 240 are facilitated by the network interface 220. For example, the network(s) 240 can include any suitable wired or wireless communication links with any one or more public and/or private networks, local and/or remote networks, etc.; and the network interface 220 implements (or facilitates use of) any related ports, protocols, etc.

Figure 3A:
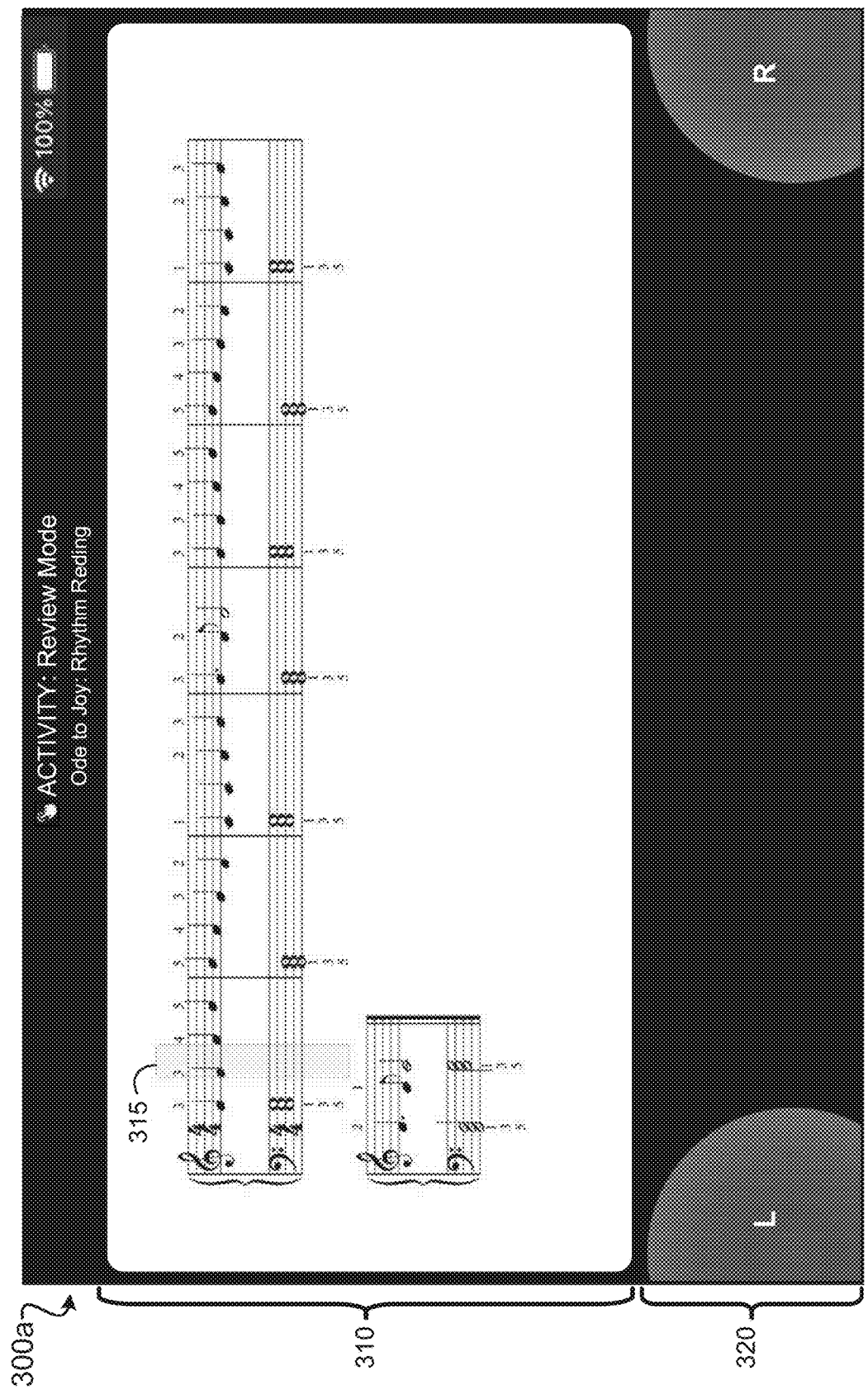
FIGS. 3A-3C shows example screenshots from an illustrative application for implementing features of haptic rhythm training system, according to various embodiments described herein.
Figure 3B:
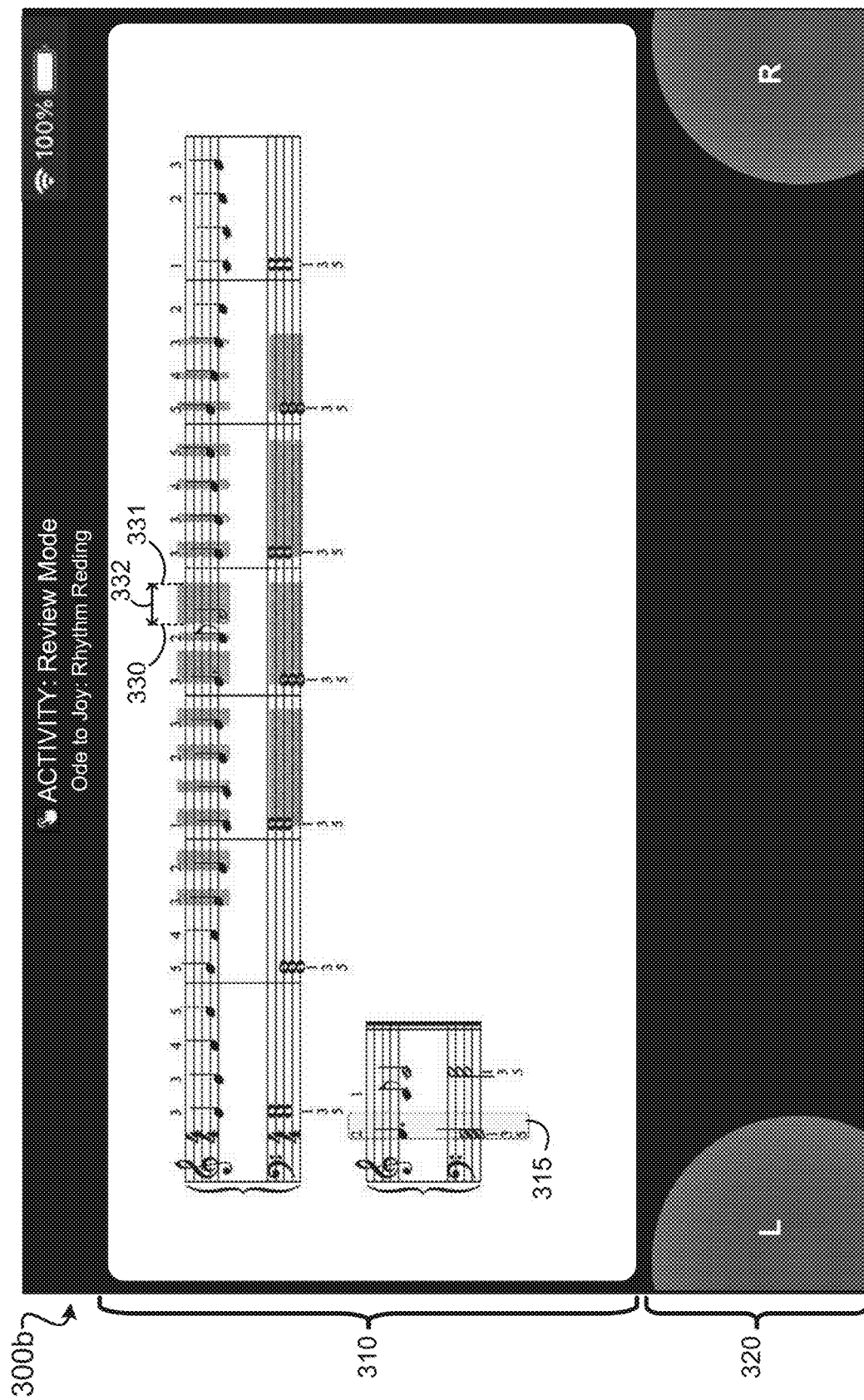
Figure 3C:
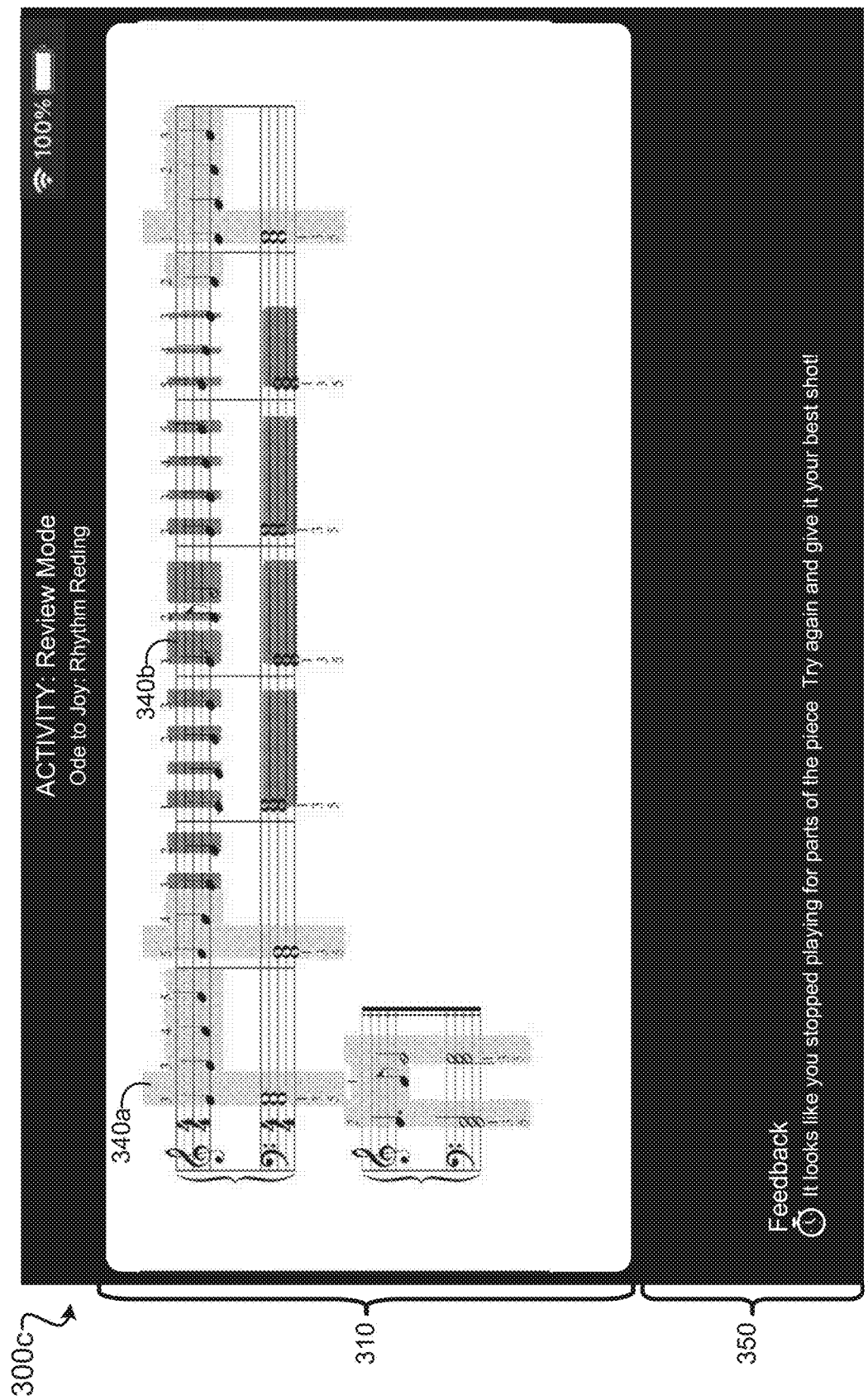

FIGS. 3A-3C shows example screenshots 300 from an illustrative application for implementing features of haptic rhythm training system, according to various embodiments described herein. Turning to FIG. 3A, a first screenshot 300a shows a graphical performance interface having a number of regions or portions. FIGS. 3A-3C assume a computational environment in which a touchscreen display implements the display interface 120 for graphical output and implements the haptic interface 110 for haptic input. Any statis or dynamic graphical outputs to the display interface 120 are generated by the display processor 125, and any haptic interactions with the haptic interface 110 (e.g., the user tapping or holding a finger or hand on the touchscreen) are detected by the haptic events processor 115 and converted to HP events data 117.

As illustrated, a first portion of the graphical performance interface (a first interface region 310) displays the musical score with the musical notation representations of the SNR events. In the illustrated example, the first interface region 310 is showing an easy piano transcription of a portion of "Ode to Joy" from Beethoven's Ninth Symphony. The displayed music score includes a grand staff with a treble clef and a bass clef, notations for notes and rests (corresponding to the sequence of SNR events), notations for a time signature, notations for measure boundaries, notations for right-hand and left-hand fingering, etc.

A second portion of the graphical performance interface (second interface region 320) is for haptic input. As described herein, embodiments can implement the second interface region 320 in different ways. In some implementations, only a single track of HP events is received, such that only a single haptic interface region is needed. Some such implementations can include a single designated region, such as a single region with a graphically defined boundary within which to access haptic interactions to be detected as HP events. For example, the haptic events processor 115 is configured so that only user interactions within the designated region of the haptic interface 110 are used to generate HP events data 117. Other such implementations do not graphically designate any particular region, and any haptic interactions with any portion of the haptic interface 110 are detected by the haptic events processor 115 as HP events.

In other implementations, multiple tracks of HP events are concurrently received, and multiple haptic interface sub-regions are needed. Some such implementations include explicit graphical definition of the multiple sub-regions, such as by displaying graphically defined boundaries. In the illustrated example, the second interface region 320 includes two explicitly designated sub-regions: one for left-hand haptic input, labeled "L"; and the other for right-hand haptic input, labeled "R". Any haptic interactions within the first sub-region of the haptic interface 110 are detected by the haptic events processor 115 as left-hand HP events, and any haptic interactions within the second sub-region of the haptic interface 110 are detected by the haptic events processor 115 as right-hand HP events. Other implementations can designate any suitable number of sub-regions. For example, four sub-regions can be designated for practicing the rhythm of a four-part moving harmony; or ten sub-regions can be designated for practicing with all ten fingers. Implementations can designate sub-regions in any suitable manner. For example, one of two sub-regions can be graphically designated as a left third of the touchscreen, and the other of two sub-regions can be graphically designated as a right third of the touchscreen; or ten sub-regions can be graphically designated to look like two sets of five fingers, or two sets of five circles. Other such implementations do not include explicit graphically designations of sub-regions. Rather, the haptic events processor 115 can group haptic inputs by location, so that detected interactions with the haptic interface 110 that occur within a threshold distance from each other are grouped into a single track of HP events. For example, during a particular exercise, a user's right thumb always contacts the touchscreen within a 9 square-inch region near the bottom-right area of the display, and the user's left thumb always contacts the touchscreen within a 6 square-inch region near the middle-left area of the display; such that the haptic events processor 115 can discern the right-thumb and left-thumb interactions as separate concurrent tracks of HP events.

In some embodiments, the first interface region 310 and the second interface region 320 are completely non-overlapping; no portion of the second interface region 320 overlaps with any portion of the first interface region 310. In other embodiments, the first interface region 310 and the second interface region 320 are partially overlapping. In other embodiments, the first interface region 310 and the second interface region 320 are completely overlapping. For example, the first interface region 310 and the second interface region 320 consume the same area; the second interface region 320 falls fully within the first interface region 310; or the first interface region 310 falls fully within the second interface region 320.

In some embodiments, the first interface region 310 is an output-only region; haptic interactions with the first interface region 310 are ignored by the haptic events processor 115. In one such embodiment, only haptic interactions inside the second interface region 320 (which is separate from the first interface region 310) are detected by the haptic events processor 115. In another such embodiment, the graphical performance interface includes one or more additional regions, other than the first interface region 310 and the second interface region 320, within which haptic interactions are detected and processed, but not for generating HP events data 117. For example, other haptic interactions in other regions of the graphical performance interface may be detected for interface navigation or control, such as to pause or resume playback, to exit the exercise, to access one or more menus, to switch applications, etc. In other embodiments, haptic interactions with the first interface region 310 are not used for HP event generation but are still detected by the haptic events processor 115 to support other features. For example, tapping on the first interface region 310 may pause or resume playback, and double-tapping on the first interface region 310 may open a menu.

During operation, as described herein, the output in the first interface region 310 is used to provide at least a graphical representation of real-time progress through a musical score at a tempo. The real-time progress can be indicated by a cursor, or other graphical element 315 that indicates a present playback location 315 on the score as mapped to the present playback time at the tempo. As illustrated, the graphical element can include a box that highlights a presently played-back one of the SNR events as graphically represented on the musical score. Alternatively, the same type of highlighting box can indicate a present beat of the playback (e.g., all SNR events falling within that beat would be within the highlighted box). Additionally, or alternatively, the graphical element can include a vertical line that moves horizontally across the measures of the score at a speed corresponding to the playback tempo. During the outputting of the graphical representations to the first interface region 310, the HP events are obtained in the second interface region 320. The HP events represent the user's rhythmic performance of the musical score at the tempo, as it is being played back at tempo.

Turning to FIG. 3B, a second screenshot 300b shows the graphical performance after some user haptic interactions have been obtained (e.g., during performance of an exercise). For example, the present playback location 315 is indicated as being in the first beat of the last measure of the score. During the user performance, real-time graphical feedback can be provided to indicate the HP events data 117 being generated by the user's performed haptic interactions. In the illustrated example, highlighting (e.g., of a different color than that of the present playback location 315 indication) indicates obtained HP events as overlaid on the graphical representations of the SNR events. Each highlighting can indicate a graphical representation of the respective HP onset time 330 (i.e., corresponding to a time when the user began interacting with the haptic interface 110), a graphical representation of the respective HP offset time 331 (i.e., corresponding to a time when the user stopped interacting with the haptic interface 110), and/or a graphical representation of the respective HP event duration 332 (i.e., corresponding to an amount of time for which the user maintained the interaction with the haptic interface 110). The performer can see, for example, that not all quarter notes are being held for a same amount of time. The illustration also shows that a number of SNR events do not have overlaid HP events data 117, indicating that these SNR events appear not to have been performed by the user.

Turning to FIG. 3C, a third screenshot 300c shows the graphical performance after the performance is complete and has been evaluated by the rhythm evaluator subsystem 150. The present playback location 315 is not shown, as the musical score is no longer being played back. Visual feedback 340 is provided to graphically map the evaluation data (generated by the rhythm evaluator subsystem 150) to the musical notation representations of the SNR events on the musical score. In the illustrated example, a first color of highlighting is used to indicate skipped events as those of the SNR events detected not to have temporally corresponding HP events data, and at least a second color of highlighting is used to indicate performed events as those of the SNR events detected to have temporally corresponding HP events data (e.g., the highlighting can further distinguish between well performed and poorly performed events).

As described herein, some embodiments can provide both micro-level and macro-level feedback. In the illustrated example, the visual feedback 340 is used to provide micro-level feedback. For example, the visual feedback 340 indicates rhythmic performance evaluation for individual SNR elements (e.g., and/or groups of SNR elements). In some embodiments, a feedback region 350 is provided to display macro-level feedback. In the illustrated example, the feedback region 350 replaced the second interface region 320. For example, the rhythm evaluator subsystem 150 determines that the user did not perform sections of the score (e.g., that there are sections of multiple missed events in a row) and generates corresponding macro-level feedback: "It looks like you stopped playing for parts of the piece. Try again and give it your best shot!" Similarly, the rhythm evaluator subsystem 150 may determine that the user did not perform any of the score (e.g., that no HP events are detected throughout the entire performance) and generates corresponding macro-level feedback: "It looks like you decided not to perform!"

Figure 6A:
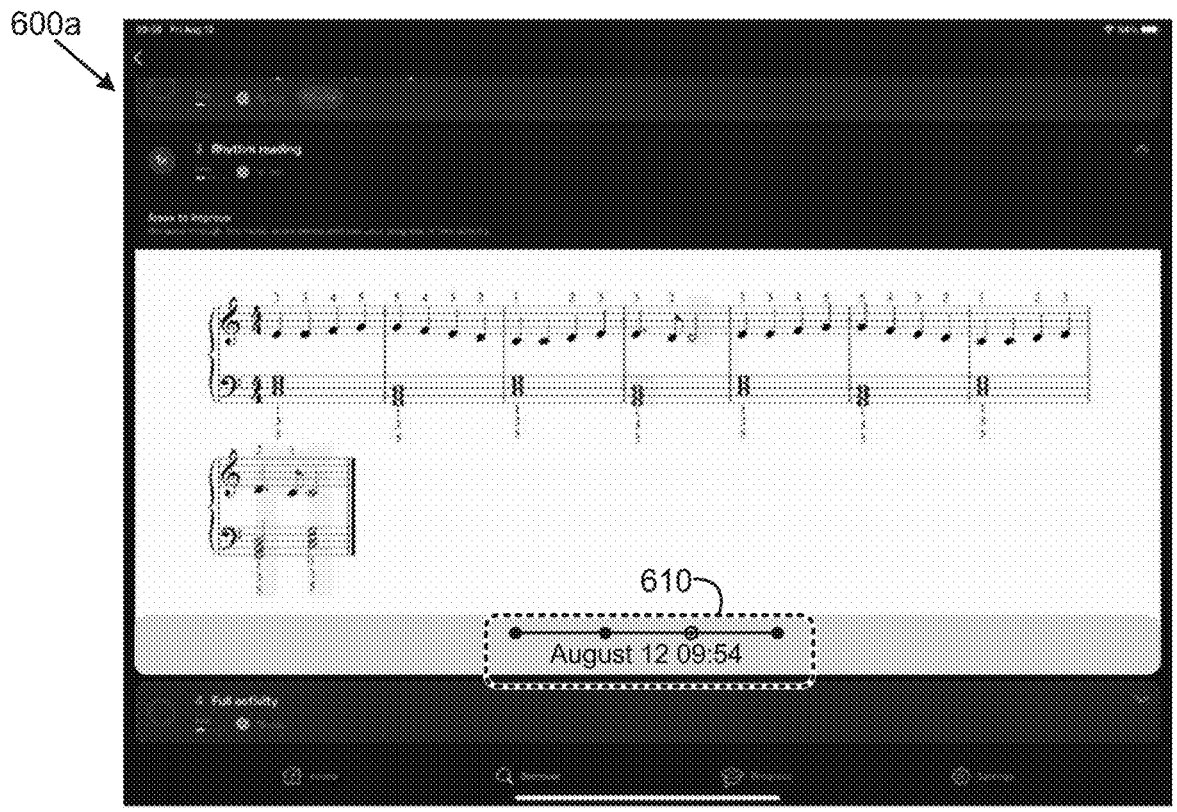
FIGS. 6A and 6B show example screenshots from an illustrative application for implementing historical user feedback features of haptic rhythm training system, according to various embodiments described herein.
Figure 6B:
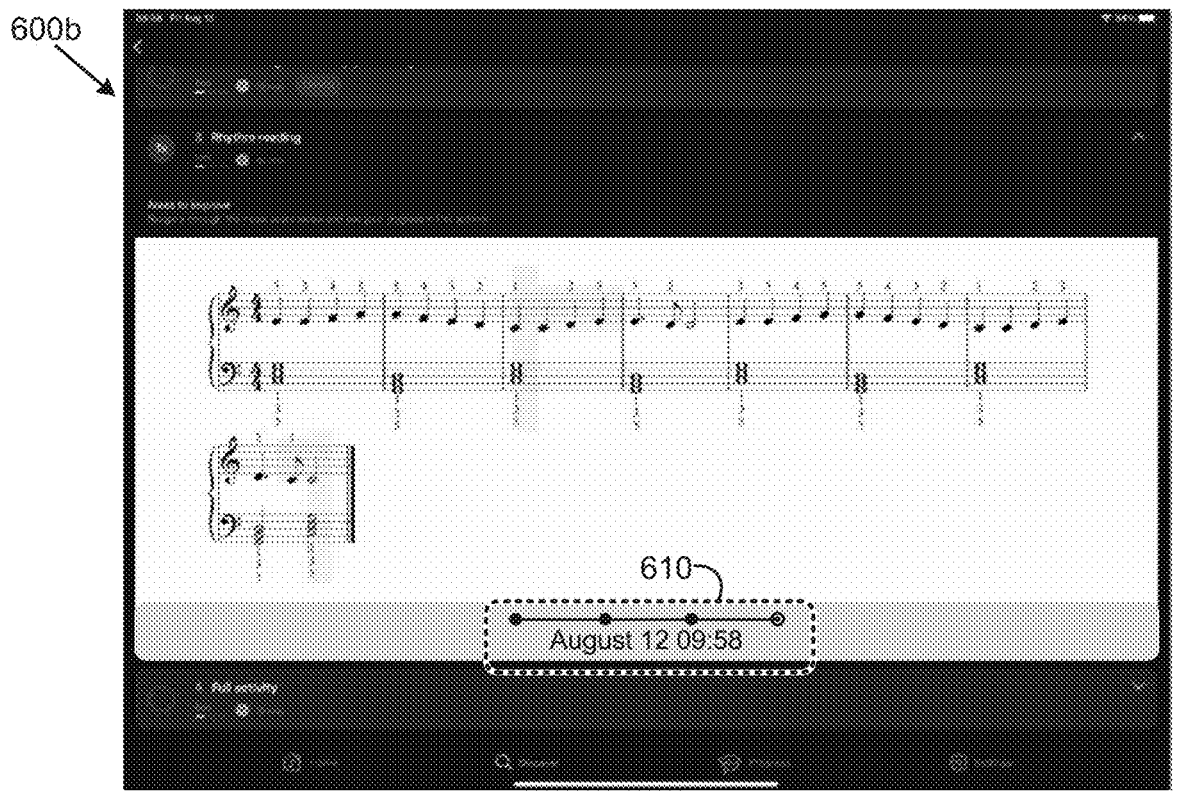

Some embodiments include additional types of interfaces for providing a user with historical feedback and/or other information. For example, FIGS. 6A and 6B show example screenshots 600 from an illustrative application for implementing historical user feedback features of haptic rhythm training system, according to various embodiments described herein. In the illustrated example, the display interface includes a historical feedback control region 610 that includes a slider bar. The slider bar indicates historical performance times. By sliding to different locations on the slider bar, the user can access feedback from those respective performance times. For example, the screenshot 600a of FIG. 6A shows a performance on August 12 at 09:54, and the screenshot 600b of FIG. 6B shows a performance four minutes later. Each performance yielded different feedback. Such historical feedback data can be stored in local storage (e.g., in the system of FIG. 1), in remote storage (e.g., in the system of FIG. 2), or in any suitable manner. Such historical performance data can be displayed to the user in alternative manners. Some implementations overlay historical data from multiple performances. Some implementations generate trend data (e.g., statistics, and/or other information) based on historical performances. Some such implementations generate and provide macro-level feedback based on the trend data across historical performances. Some such implementations suggest additional exercises based on such trend data.

Figure 4:
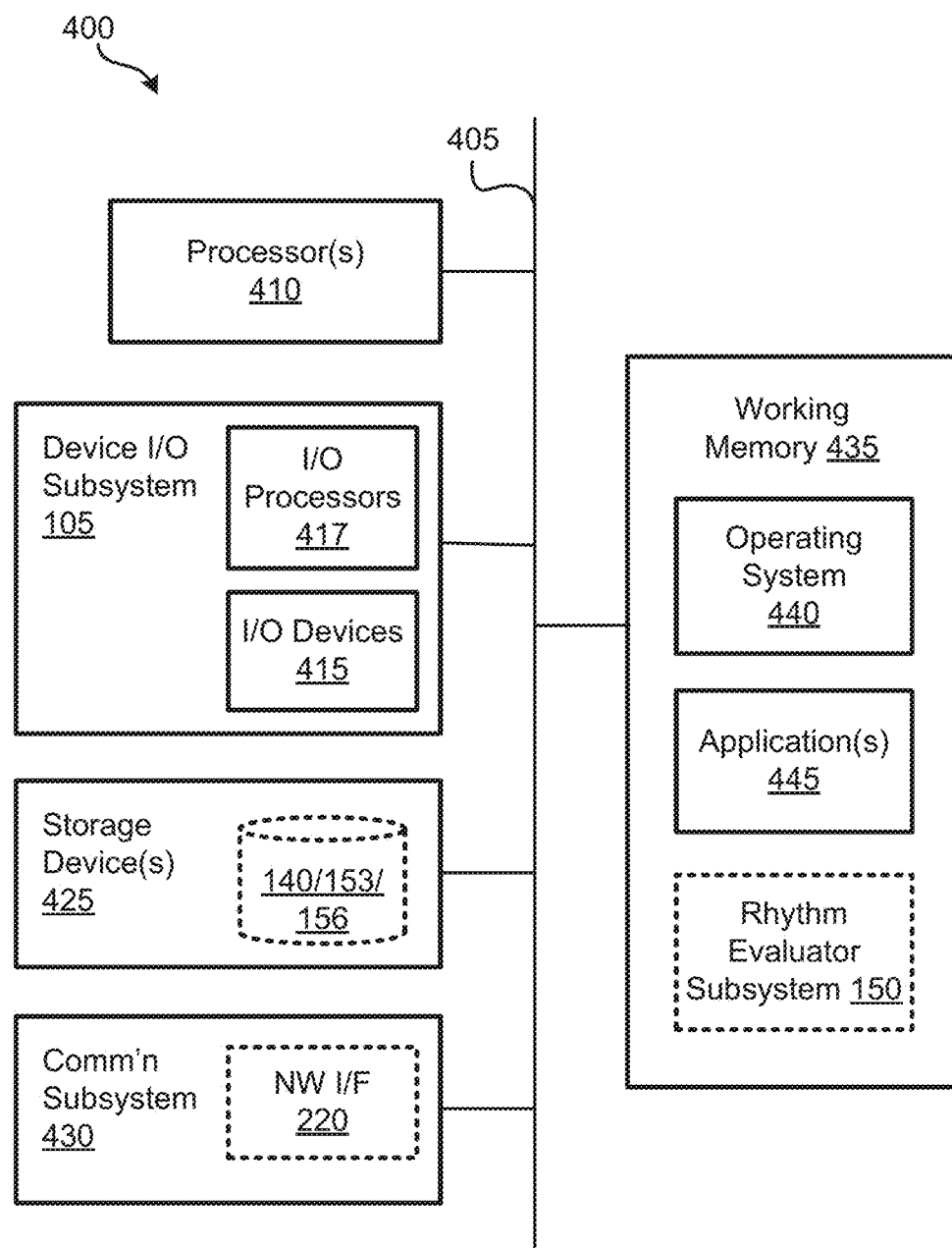
FIG. 4 provides a schematic illustration of one embodiment of a computer system that can implement various system components and/or perform various steps of methods provided by various embodiments.

Embodiments of haptic rhythm training systems, or components thereof, can be implemented on, and/or can incorporate, one or more computer systems, as illustrated in FIG. 4. FIG. 4 provides a schematic illustration of one embodiment of a computer system 400 that can implement various system components and/or perform various steps of methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown including hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like). As illustrated, some embodiments include a device 110 subsystem 105, which can include one or more I/O devices 415 and one or more I/O processors 417. As described herein, the I/O devices 415 can include a haptic interface 110, a display interface 120, and an audio interface 130. The I/O processors 417 can include a haptic events processor 115, a display processor 125, and an audio processor 135. Additionally, input devices can include, without limitation, buttons, knobs, switches, keypads, touchscreens, remote controls, and/or the like; and output devices can include, without limitation, displays, indicators, gauges, and/or the like.

Some embodiments of the computer system 400 interface with additional computers, peripheral devices, etc., such that the device U/O subsystem 105 can include various physical and/or logical interfaces (e.g., ports, etc.) to facilitate component-to-component interaction and control.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 425 include the non-transient memory 240. In some embodiments, the storage devices 425 can include the MS data store 140, the HP events store 153, and/or the evaluation data store 156.

The computer system 400 can also include a communications subsystem 430, which can include, without limitation, any suitable antennas, transceivers, modems, network cards (wireless or wired), infrared communication devices, wireless communication devices, chipsets (such as a Bluetooth™ device, an 802.11 device, a WiFi device, a WiMax device, cellular communication device, etc.), and/or other communication components. As illustrated, the communications subsystem 430 can also include the network interface 220 for facilitating communications between user devices and remote servers via communication networks. The communications subsystem 430 can further facilitate communications with other computational systems.

In many embodiments, the computer system 400 will further include a working memory 435, which can include a RAM or ROM device, as described herein. The computer system 400 also can include software elements, shown as currently being located within the working memory 435, including an operating system 440, device drivers, executable libraries, and/or other code, such as one or more application programs 445, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general-purpose computer (or other device) to perform one or more operations in accordance with the described methods. In some embodiments, the operating system 440 and the working memory 435 are used in conjunction with the one or more processors 410 to implement features of the rhythm evaluator subsystem 150.

A set of these instructions and/or codes can be stored on a non-transitory computer-readable storage medium, such as the non-transitory storage device(s) 425 described above. In some cases, the storage medium can be incorporated within a computer system, such as computer system 400. In other embodiments, the storage medium can be separate from a computer system (e.g., a removable medium, such as a compact disc), and/or provided in an installation package, such that the storage medium can be used to program, configure, and/or adapt a general-purpose computer with the instructions/code stored thereon. These instructions can take the form of executable code, which is executable by the computer system 400 and/or can take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which can be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 can cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media can be involved in providing instructions/code to processor(s) 410 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 400. The communications subsystem 430 (and/or components thereof) generally will receive signals, and the bus 405 then can carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

Figure 5:
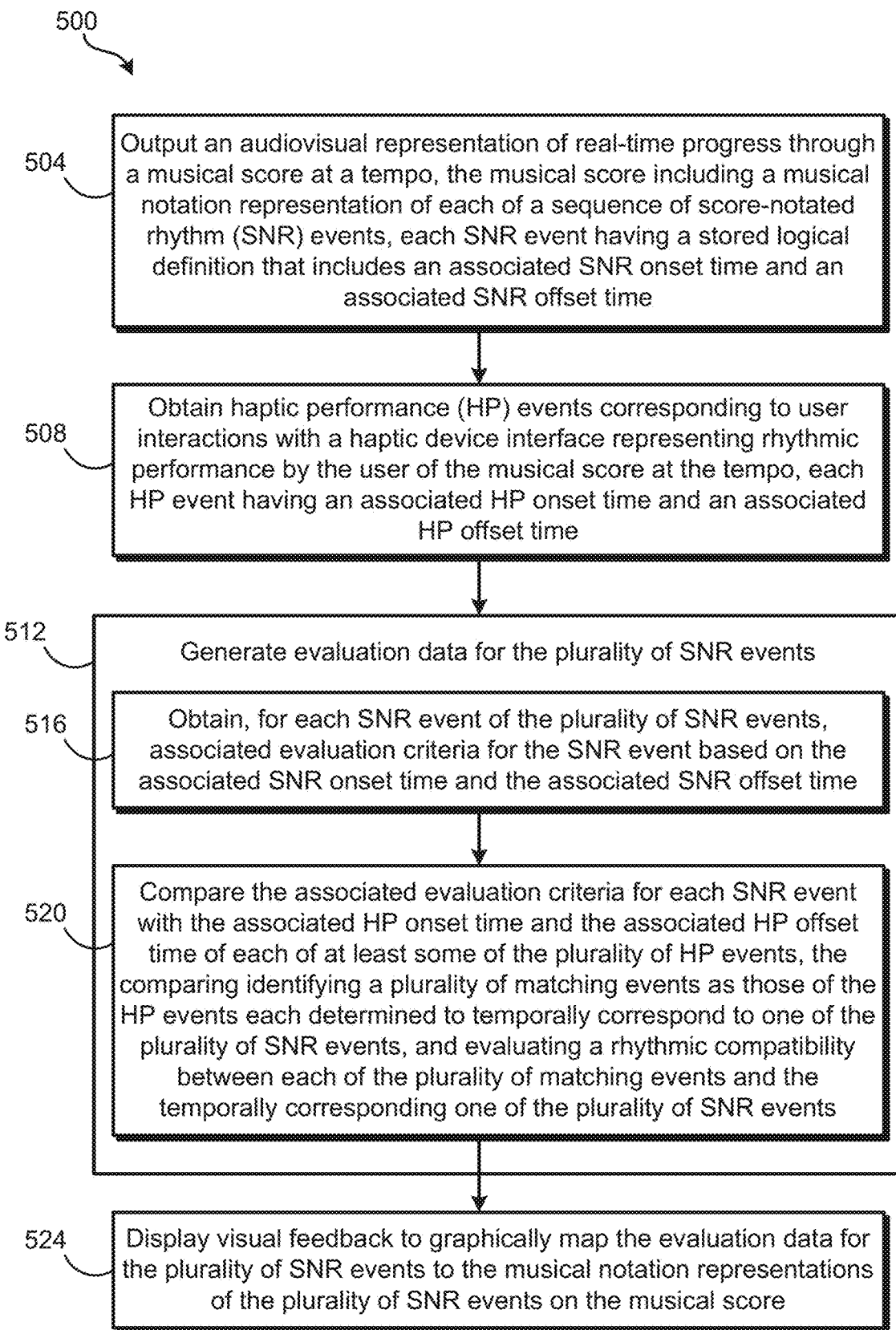
FIG. 5 shows a flow diagram of an illustrative method for haptic-based evaluation of musical-score-referenced rhythmic performance, according to various embodiments.

FIG. 5 shows a flow diagram of an illustrative method 500 for haptic-based evaluation of musical-score-referenced rhythmic performance, according to various embodiments. The method 500 can be implemented using any suitable system, including those described above in FIGS. 1-4. Embodiments of the method 500 begin at stage 504 by outputting, via an output device interface of a computational device, an audiovisual representation of real-time progress through a musical score at a tempo. The musical score includes a musical notation representation of each of a sequence of SNR events. Each SNR event has a stored logical definition that includes an associated SNR onset time and an associated SNR offset time. In some embodiments, some of the SNR events are note events, and others of the SNR events are rest events. The musical notation representation of each note event indicates one or more notes of one or more pitches to be held for a notated duration beginning at the SNR onset time of the corresponding SNR event and ending at the SNR offset time of the corresponding SNR event. The musical notation representation of each rest event indicates silence to be maintained for the notated duration beginning at the SNR onset time of the corresponding SNR event and ending at the SNR offset time of the corresponding SNR event.

In some embodiments, the outputting in stage 504 includes displaying the musical score via the output device interface; playing back audio corresponding at least to each of the sequence of SNR events to aurally represent the real-time progress through the musical score at the tempo; and displaying, during the playing back, overlaid on the musical score, a graphical position indicator (e.g., a cursor, a box around the presently played SNR event, etc.) that dynamically updates to represent which of the sequence of SNR events presently corresponds to the audio being played back, such that the graphical position indicator visually represents the real-time progress through the musical score at the tempo. In some such embodiments, the outputting at stage 504 further includes displaying, during the playing back, overlaid on the musical score, a graphical representation of the associated HP onset time and the associated HP offset time of each of the HP events as each of the plurality of HP events is obtained. For example, such an overlay provides the user with real-time feedback indicating how the haptic interactions are being received (e.g., including when the HP onset times and HP offset times are being recorded relative to the score playback). In some such embodiments, the outputting at stage 504 further includes playing back a rhythm track (e.g., a metronome, a backing track, etc.) at the tempo and synchronously with playing back the audio.

At stage 508, embodiments can obtain, during the outputting, HP events corresponding to user interactions with a haptic device interface of the computational device. The HP events represent rhythmic performance by the user of the musical score at the tempo. Each HP event has an associated HP onset time and an associated HP offset time.

At stage 512, embodiments can generate, by a rhythm evaluator subsystem in communication with the output device interface and the haptic device interface, evaluation data for the SNR events. The generating at stage 512 can involve performing stages 516 and 520. At stage 516, embodiments can obtain, for each of the SNR events, associated evaluation criteria for the SNR event based on the associated SNR onset time and the associated SNR offset time. At stage 520, embodiments can compare the associated evaluation criteria for each SNR event with the associated HP onset time and the associated HP offset time of each of at least some of the HP events. The comparing at stage 520 can include identifying matching events as those of the HP events each determined to temporally correspond to one of the SNR events, and evaluating a rhythmic compatibility between each of the plurality of matching events and the temporally corresponding one of the plurality of SNR events.

In some embodiments, the outputting in stage 508 establishes a performance time basis, such that each HP onset time and each HP offset time corresponds to a respective time value in the performance time basis. In such embodiments, the generating the evaluation data at stage 512 can include, for each SNR event, mapping the associated SNR onset time and the associated SNR offset time to the performance time basis. The evaluation criteria in stage 516 can be defined relative to the performance time basis, and the comparing in stage 520 can be performed relative to the performance time basis.

In some embodiments, obtaining the associated evaluation criteria in stage 516 includes computing a valid match window relative to each SNR onset time. Some such embodiments can setting a duration of the valid match window based on the tempo and/or based on determining a performance skill level based on a predetermined skill level of the user and/or a predetermined difficulty level of the musical score. In some such embodiments, In such embodiments, the comparing at stage 520 can identify the matching events as those of the HP events each determined to temporally correspond to one of the plurality of SNR events by: searching the HP events to determine whether any of the plurality of HP events has an associated HP onset time that is within the valid match window for the SNR event; responsive to determining that none of the plurality of HP events has an associated HP onset time that is within the valid match window for the SNR event, identifying the SNR event as a skipped SNR event; and responsive to determining that a particular HP event of the plurality of HP events has an associated HP onset time that is within the valid match window for the SNR event, identifying the SNR event as a performed SNR event and associated the SNR event with the particular HP event as the matching event of the plurality of matching events determined to temporally correspond the SNR event, such that the performed SNR event has a performed onset time corresponding to the HP onset time of the particular HP event and a performed offset time corresponding to the HP offset time of the particular HP event.

At stage 524, embodiments can display, via the output device interface, visual feedback to graphically map the evaluation data for the plurality of SNR events to the musical notation representations of the plurality of SNR events on the musical score. In some embodiments, the displaying at stage 524 includes, for each performed SNR event, graphically mapping the performed onset time and the performed offset time of the performed SNR event to the musical notation representation of the SNR event on the musical score. In some embodiments, the displaying at stage 524 includes, for each performed SNR event: first graphically mapping the performed onset time, the performed offset time of the performed SNR event to the musical notation representation of the SNR event on the musical score; and second graphically mapping the associated SNR onset time and the associated SNR offset time of the performed SNR event to the musical notation representation of the performed SNR event on the musical score, wherein the first graphically mapping is visually distinguishable from the second graphically mapping. In some embodiments, the displaying at stage 524 includes, for each skipped SNR event, graphically mapping the associated SNR onset time and the associated SNR offset time of the SNR event to the musical notation representation of the skipped SNR event on the musical score. In some embodiments, the obtaining the associated evaluation criteria for each SNR event at stage 516 includes computing a valid offset window relative to the associated SNR offset time; and the displaying at stage 524 includes, for each performed SNR event, graphically mapping a full performance indication to the musical notation representation of the performed SNR event on the musical score only responsive to determining that the performed offset is within the valid offset window.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for haptic-based evaluation of musical-score-referenced rhythmic performance, the method comprising:
    outputting, via an output device interface of a computational device, an audiovisual representation of real-time progress through a musical score at a tempo, the musical score including a musical notation representation of each of a sequence of score-notated rhythm (SNR) events, each SNR event having a stored logical definition that includes an associated SNR onset time and an associated SNR offset time;
    obtaining, during the outputting, a plurality of haptic performance (HP) events corresponding to user interactions with a haptic device interface of the computational device representing rhythmic performance by the user of the musical score at the tempo, each HP event having an associated HP onset time and an associated HP offset time;
    generating, by a rhythm evaluator subsystem in communication with the output device interface and the haptic device interface, evaluation data for the sequence of SNR events by:
        obtaining, for each SNR event of the sequence of SNR events, associated evaluation criteria for the SNR event based on the associated SNR onset time and the associated SNR offset time; and
        comparing the associated evaluation criteria for each SNR event with the associated HP onset time and the associated HP offset time of each of at least some of the plurality of HP events, the comparing identifying a plurality of matching events as those of the HP events each determined to temporally correspond to one of the sequence of SNR events, and evaluating a rhythmic compatibility between each of the plurality of matching events and the temporally corresponding one of the sequence of SNR events; and
    displaying, via the output device interface, visual feedback to graphically map the evaluation data for the sequence of SNR events to the musical notation representations of the sequence of SNR events on the musical score.

2. The method of claim 1, wherein:
    the output device of the computational device is a touchscreen interface; and
    the outputting the audiovisual representation comprises outputting a graphical performance interface via the touchscreen interface, such that:
        a first portion of the graphical performance interface displays the musical score with the musical notation representations of the plurality of SNR events; and
        a second portion of the graphical performance interface is designated for haptic input, such that the obtaining the plurality of HP events corresponds to the user interactions with the haptic device interface only within the second portion of the graphical performance interface.

3. The method of claim 2, wherein the outputting the audiovisual representation further comprises:
    outputting a graphical indication of boundaries of the second portion of the graphical performance interface within which the user interactions with the haptic device interface are recognized as HP events, the second portion of the graphical performance interface being completely non-overlapping with the first portion of the graphical performance interface.

4. The method of claim 2, wherein second portion of the graphical performance interface comprises:
    a first region graphically designated for left-hand user interactions with the haptic device interface, the left-hand user interactions to be recognized as left-hand HP events; and
    a second region graphically designated for right-hand user interactions with the haptic device interface, the right-hand user interactions to be recognized as right-hand HP events, the second region being completely non-overlapping with the first region.

5. The method of claim 1, wherein:
    the outputting establishes a performance time basis, such that each HP onset time and each HP offset time corresponds to a respective time value in the performance time basis; and
    the generating the evaluation data for the plurality of SNR events comprises, for each SNR event, mapping the associated SNR onset time and the associated SNR offset time to the performance time basis, the evaluation criteria for each SNR event being defined relative to the performance time basis, and the comparing the associated evaluation criteria for each SNR event being performed relative to the performance time basis.

6. The method of claim 1, wherein:
    the obtaining the associated evaluation criteria for each SNR event comprises computing a valid match window relative to the SNR onset time; and
    the comparing identifies the plurality of matching events as those of the HP events each determined to temporally correspond to one of the plurality of SNR events by:
        searching the plurality of HP events to determine whether any of the plurality of HP events has an associated HP onset time that is within the valid match window for the SNR event;
        responsive to determining that none of the plurality of HP events has an associated HP onset time that is within the valid match window for the SNR event, identifying the SNR event as a skipped SNR event; and
        responsive to determining that a particular HP event of the plurality of HP events has an associated HP onset time that is within the valid match window for the SNR event, identifying the SNR event as a performed SNR event and associated the SNR event with the particular HP event as the matching event of the plurality of matching events determined to temporally correspond the SNR event, such that the performed SNR event has a performed onset time corresponding to the HP onset time of the particular HP event and a performed offset time corresponding to the HP offset time of the particular HP event.

7. The method of claim 6, wherein the comparing further comprises:

setting a duration of the valid match window based on the tempo.

8. The method of claim 6, wherein:
the generating the evaluation data comprises determining a performance skill level based on a predetermined skill level of the user and/or a predetermined difficulty level of the musical score; and
the comparing further comprises setting a duration of the valid match window based on the performance skill level.

9. The method of claim 6, wherein:
the displaying the visual feedback to graphically map the evaluation data comprises, for each performed SNR event, graphically mapping the performed onset time and the performed offset time of the performed SNR event to the musical notation representation of the SNR event on the musical score.

10. The method of claim 6, wherein:
the displaying the visual feedback to graphically map the evaluation data comprises, for each performed SNR event:
first graphically mapping the performed onset time, the performed offset time of the performed SNR event to the musical notation representation of the SNR event on the musical score; and
second graphically mapping the associated SNR onset time and the associated SNR offset time of the performed SNR event to the musical notation representation of the performed SNR event on the musical score,
wherein the first graphically mapping is visually distinguishable from the second graphically mapping.

11. The method of claim 6, wherein:
the displaying the visual feedback to graphically map the evaluation data comprises, for each skipped SNR event, graphically mapping the associated SNR onset time and the associated SNR offset time of the SNR event to the musical notation representation of the skipped SNR event on the musical score.

12. The method of claim 6, wherein:
the obtaining the associated evaluation criteria for each SNR event further comprises computing a valid offset window relative to the associated SNR offset time; and
the displaying the visual feedback comprises, for each performed SNR event, graphically mapping a full performance indication to the musical notation representation of the performed SNR event on the musical score only responsive to determining that the performed offset is within the valid offset window.

13. The method of claim 1, wherein:
the outputting comprises displaying the musical notation representation of the sequence of SNR events on a grand staff, such that the sequence of SNR events comprises right-hand SNR events and left-hand SNR events; and
the obtaining the plurality of HP events comprises obtaining a first portion of the HP events as right-hand HP events from a designated right-hand portion of the haptic device interface and obtaining a second portion of the HP events as left-hand HP events from a designated left-hand portion of the haptic device interface.

14. The method of claim 13, wherein:
the generating the evaluation data for the plurality of SNR events is by:
comparing the associated evaluation criteria for each of the right-hand SNR events with the associated HP onset time and the associated HP offset time of each of only the right-hand HP events; and
comparing the associated evaluation criteria for each of the right-hand SNR events with the associated HP onset time and the associated HP offset time of each of only the left-hand HP events.

15. The method of claim 1, wherein the outputting the audiovisual representation of real-time progress through the musical score at the tempo comprises:
displaying the musical score via the output device interface;
playing back audio corresponding at least to each of the sequence of SNR events to aurally represent the real-time progress through the musical score at the tempo; and
displaying, during the playing back, overlaid on the musical score, a graphical position indicator that dynamically updates to represent which of the sequence of SNR events presently corresponds to the audio being played back, such that the graphical position indicator visually represents the real-time progress through the musical score at the tempo.

16. The method of claim 15, wherein the outputting the audiovisual representation of real-time progress through the musical score at the tempo further comprises:
displaying, during the playing back, overlaid on the musical score, a graphical representation of the associated HP onset time and the associated HP offset time of each of the plurality of HP events as each of the plurality of HP events is obtained.

17. The method of claim 15, wherein the outputting the audiovisual representation of real-time progress through the musical score at the tempo further comprises:
playing back a rhythm track at the tempo and synchronously with playing back the audio.

18. The method of claim 1, wherein:
each of a first subset of the plurality of SNR events corresponds to a note event, the musical notation representation of each note event indicating one or more notes of one or more pitches to be held for a notated duration beginning at the SNR onset time of the corresponding SNR event and ending at the SNR offset time of the corresponding SNR event; and
each of a second subset of the plurality of SNR events corresponds to a rest event, the musical notation representation of each rest event indicating silence to be maintained for the notated duration beginning at the SNR onset time of the corresponding SNR event and ending at the SNR offset time of the corresponding SNR event.

19. The method of claim 1, wherein:
the rhythm evaluator subsystem is implemented by one or more processors of the computational device.

20. The method of claim 1, wherein:
the rhythm evaluator subsystem is implemented by a server in communication with the computational device via a communication network.

* * * * *